(12) United States Patent
Cohen Gazit et al.

(10) Patent No.: US 12,201,566 B2
(45) Date of Patent: Jan. 21, 2025

(54) HEAD SUPPORT ASSEMBLY AND HEAD SUPPORT UNIT

(71) Applicant: HEADOVATIONS LTD, Tel Aviv (IL)

(72) Inventors: Ben Cohen Gazit, Tel Aviv (IL);
Kalman Shaham, Tel Aviv (IL);
Michael Librus, Netanya (IL)

(73) Assignee: HEADOVATIONS LTD, Tel-Aviv (IL)

( * ) Notice: Subject to any disclaimer, the term of this patent is extended or adjusted under 35 U.S.C. 154(b) by 39 days.

(21) Appl. No.: 18/011,077

(22) PCT Filed: Jun. 16, 2021

(86) PCT No.: PCT/IL2021/050726
§ 371 (c)(1),
(2) Date: Dec. 16, 2022

(87) PCT Pub. No.: WO2021/255734
PCT Pub. Date: Dec. 23, 2021

(65) Prior Publication Data
US 2023/0240920 A1 Aug. 3, 2023

(30) Foreign Application Priority Data

Jun. 17, 2020 (IL) .......................................... 275441

(51) Int. Cl.
*A61G 5/12* (2006.01)
(52) U.S. Cl.
CPC .................................... *A61G 5/121* (2016.11)
(58) Field of Classification Search
CPC ...................................................... A61G 5/121
See application file for complete search history.

(56) References Cited

U.S. PATENT DOCUMENTS 3,730,589 A * 5/1973 Lane ...................... A61G 5/121
297/391
4,415,177 A 11/1983 Hale et al.
(Continued)

FOREIGN PATENT DOCUMENTS

CA          3181993 A1 * 12/2021   ............. A61G 5/121
CN         202263113 U     6/2012
(Continued)

OTHER PUBLICATIONS

International Search Report and Written Opinion in International Appln. No. PCT/IL2021/050726, mailed on Oct. 12, 2021, 13 pages.
(Continued)

*Primary Examiner* — Timothy J Brindley
(74) *Attorney, Agent, or Firm* — Fish & Richardson P.C.

(57) ABSTRACT

According to an aspect of the presently disclosed subject matter, there is provided a head support assembly attachable to a seat comprising a right frame member and a left frame member. The head support assembly comprising: a right support post and a left support post; a right coupler and a left coupler, articulatable respectively to the right frame member and to the left frame member, and configured for independently arresting the right support post and the left support post, respectively, in a manner facilitating tilting the support post at least partially about a pitch axis extending between the right coupler and the left coupler; and a head support unit articulable to a right top portion of the right support post and to a left top portion of the left support post. The head support assembly of the first aspect is configured to be attached to any seat having right and left frame members, and the head support unit thereof is configured to be mounted to a head of a user seated on the seat for providing support to the head and preventing the head from being tilted forwardly and/or downwardly. In some cases, the head support unit can have (Continued)

a support body which is configured with a front portion to which a head restraint is attachable. In such cases, the head restraint is configured for providing improved head and neck support to a user while seated in the seat.

20 Claims, 21 Drawing Sheets

(56) References Cited

U.S. PATENT DOCUMENTS

| | | | | |
|---|---|---|---|---|
| 4,989,836 | A * | 2/1991 | Hudson, III | A47C 7/383 |
| | | | | 297/391 |
| 5,074,574 | A * | 12/1991 | Carwin | A61G 5/121 |
| | | | | 297/397 |
| 5,168,889 | A | 12/1992 | Diestel | |
| 5,338,048 | A | 8/1994 | Medina | |
| 5,395,158 | A | 3/1995 | Cordia | |
| 5,395,195 | A | 3/1995 | Fulmer | |
| D413,841 | S * | 9/1999 | Bar | D12/133 |
| 6,095,611 | A * | 8/2000 | Bar | A61G 5/1067 |
| | | | | 297/284.3 |
| 6,105,997 | A | 8/2000 | Watkins | |
| 6,761,338 | B2 * | 7/2004 | Yamasaki | A61G 5/121 |
| | | | | 248/118 |
| 7,104,610 | B2 * | 9/2006 | Cramer | A61G 5/12 |
| | | | | 248/230.1 |
| 7,140,678 | B1 | 11/2006 | Grant | |
| 7,207,630 | B1 * | 4/2007 | Reynolds | A61G 5/1054 |
| | | | | 297/400 |
| 8,448,728 | B2 | 5/2013 | Schneider | |
| 8,517,469 | B1 * | 8/2013 | Hetzel | A61G 5/1067 |
| | | | | 297/284.4 |
| 9,084,710 | B2 | 7/2015 | Paul et al. | |
| 9,566,885 | B2 | 2/2017 | Gazit | |
| 9,782,310 | B1 * | 10/2017 | Khaligh | A61G 5/12 |
| 10,194,745 | B2 * | 2/2019 | DuFresne | A47C 1/0246 |
| 10,800,307 | B1 * | 10/2020 | Zhou | B60N 2/99 |
| 10,820,707 | B2 * | 11/2020 | Patel | A47C 7/462 |
| 10,874,221 | B1 * | 12/2020 | Lin | A47C 7/38 |
| 11,554,059 | B2 * | 1/2023 | Cohen Gazit | A61G 5/1054 |
| 2001/0054837 | A1 | 12/2001 | O'Connor | |
| 2003/0006578 | A1 | 1/2003 | Melgarejo et al. | |
| 2010/0078053 | A1 | 4/2010 | Hughes | |
| 2016/0068086 | A1 * | 3/2016 | Gazit | B60N 2/806 |
| | | | | 297/398 |
| 2017/0190349 | A1 | 7/2017 | Tan | |
| 2021/0100702 | A1 * | 4/2021 | Su | A61G 5/024 |
| 2021/0236356 | A1 * | 8/2021 | Cohen Gazit | A61G 5/121 |
| 2022/0304471 | A1 * | 9/2022 | Samila | A47C 7/38 |

FOREIGN PATENT DOCUMENTS

| | | | | |
|---|---|---|---|---|
| CN | 203935342 | U | 11/2014 | |
| CN | 203953991 | U | 11/2014 | |
| CN | 205007152 | U | 2/2016 | |
| CN | 107049623 | A | 8/2017 | |
| CN | 108433898 | A * | 8/2018 | A61G 5/121 |
| CN | 114569346 | A * | 6/2022 | |
| DE | 202005019582 | U1 * | 4/2006 | A61G 5/12 |
| EP | 2243454 | | 10/2010 | |
| FR | 3022127 | A3 | 12/2015 | |
| GB | 2258639 | A | 2/1993 | |
| JP | 2004113722 | A | 4/2004 | |
| JP | 2005028095 | A | 2/2005 | |
| JP | 2007167320 | A | 7/2007 | |
| JP | 3174020 | U | 3/2012 | |
| JP | 5858545 | B2 | 2/2016 | |
| JP | 3212917 | U | 10/2017 | |
| KR | 20120134256 | A | 12/2012 | |
| KR | 20140116635 | A | 10/2014 | |
| WO | WO 199204002 | | 3/1992 | |
| WO | WO 2007018926 | A2 | 2/2007 | |
| WO | WO 2016038605 | A1 | 3/2016 | |
| WO | WO-2019141325 | A1 * | 7/2019 | A47K 11/04 |
| WO | WO 2019207580 | A1 | 10/2019 | |
| WO | WO-2020184989 | A1 * | 9/2020 | A61G 5/1091 |

OTHER PUBLICATIONS

SunriseMedical.com [online], "Wheelchairs, Wheelchair Seating & Mobility Products", available on or before Feb. 16, 1998, via Internet Archive: Wayback Machine URL<http://web.archive.org/web/19980216062518/http://www.sunrisemedical.com/> retrieved on Dec. 15, 2022, retrieved from URL<https://www.sunrisemedical.com/manual-wheelchairs/zippie/tilt-in-spacewheelchairs/iris?lang=en-CA#prettyPhoto>, 2 pages.

SunriseMedical.com [online], "Zippie® Iris® Tilt in Space Wheelchair, Cutting-edge rotation-in-space wheelchair technology designed just for kids", available on or before Nov. 10, 2015, via Internet Archive: Wayback Machine URL <http://web.archive.org/web/20151110190707/https://www.sunrisemedical.com/manual-wheelchairs/zippie/tilt-in-space-wheelchairs/iris>, retrieved on Dec. 15, 2022, URL<https://www.sunrisemedical.com/manual-wheelchairs/zippie/tilt-in-space-wheelchairs/iris>, 9 pages.

Extended European Search Report in European U.S. Appl. No. 21/826,296, dated May 28, 2024, 8 pages.

* cited by examiner

HEAD SUPPORT ASSEMBLY AND HEAD SUPPORT UNIT

TECHNOLOGICAL FIELD

The present disclosure is directed to a head support assembly for a seat, and a head support unit for use with a head support assembly.

BACKGROUND

U.S. Pat. No. 9,566,885 discloses a head restraint, comprising: a headrest member configured with a back portion and two side portions extending therefrom, the side portions are foldable with respect to the back portion so as to allow the headrest member to assume a first state in which the side portions are spaced from each other at a first extent and a second state in which the side portions are spaced from each other to a second extent which is smaller than said first extent; a mounting arrangement articulated to the headrest member for mounting the head restraint to a seat; and a restraining member pivotally articulated to said side portions and configured for rotation at least between an upward position and a downward position, wherein displacement of the restraining member between its upward position and its downward position is configured to cause the headrest member to assume its first and second states, respectively.

WO 2019/207580, the content of which is incorporated by reference, discloses a head support unit for a head support assembly having a right support post and a left support post. The head support unit comprises: a support body; a right attachment element and a left attachment element configured for articulation with said right support post and said left support post, respectively; and an adjustment mechanism configured for selectively adjusting the position of the right attachment element and the left attachment element with respect to each other, at least from an extended position towards a retracted position.

However, in order to use the head support assembly and the head support unit of WO 2019/207580 in cases in which a sitting user has a dropped head syndrome, or any other disease in which his head is tilted downward, it is required first to manually strengthen the user's head while applying a lot force, and only when the head is positioned correctly, the head support unit can be mounted thereto. This manner of operation of the head support assembly and the head support unit of WO 2019/207580 may require two or more operators that would have to apply a lot of force, and it can cause much discomfort, and even pain to the sitting user.

GENERAL DESCRIPTION

According to a first aspect of the presently disclosed subject matter, there is provided a head support assembly attachable to a seat comprising a right frame member and a left frame member, the head support assembly comprising:

a right support post and a left support post;

a right coupler and a left coupler, articulatable respectively to the right frame member and to the left frame member, and configured for independently arresting the right support post and the left support post, respectively, in a manner facilitating tilting the support post at least partially about a pitch axis extending between the right coupler and the left coupler; and a head support unit articulable to a right top portion of the right support post and to a left top portion of the left support post.

The term 'seat' as used herein denotes any device having a seat portion and a back portion configured for supporting a sitting user, and can be any one of the following: a wheelchair, a booster seat, a safety seat, a stroller, a vehicle seat, a chair, a bench, etc.

The head support assembly of the first aspect is configured to be attached to any seat having right and left frame members, and the head support unit thereof is configured to be mounted to a head of a user seated on the seat for providing support to the head and preventing the head from being tilted forwardly and/or downwardly. In some cases, the head support unit can have a support body which is configured with a front portion to which a head restraint is attachable. In such cases, the head restraint is configured for providing improved head and neck support to a user while seated in the seat, e.g., in case the user falls asleep or in case of an individual with physical disorders. More particularly, the head restraint is configured for preventing the user's head from falling forward, and furthermore, for preventing the user's head from tilting to the left or the right side. This provides comfortable and stable support of the user's head while sitting on the seat. According to a particular example, the head restraint can be the one disclosed in U.S. Pat. No. 9,566,885, the content of which is incorporated herein by reference. In use, when the user's head is mounted to the head restraint, a restraining member of the head restraint can be positioned at its downward position in front of the user's forehead.

The head support assembly of the first aspect is also configured to be used for holding the head up in cases in which the sitting user has a dropped head syndrome, or any other disease that effects the neck muscles, like ALS, CP, Parkinsons, Muscular Dystrophy, Kyphosis, Scoliosis, as well as conditions resulting from brain trauma, radiation therapy and even cases of advanced degenerative spinal conditions. The use of the head support assembly can provide to the user comfort, relief of pain, an ability to perform daily activities, the ability for properly breathing and swallowing.

In such cases, instead of lifting and strengthening the head of the user in a manual manner before mounting the head to the head support unit (which can be in some cases even impossible), the head support unit of the head support assembly is configured to be tilted toward the head of the user by tilting of the right support post and/or the left support post. By this, upon bringing the head support unit in proximity to the user's head, the head can be mounted to the head support unit and/or to the head restraint mounted thereto, and the entire head support unit can be tilted at the opposite direction together with the user's head, thereby strengthening the neck and the back of the user, and holding the head up. In this case, bottom portions of the right support post and the left support post can be used as a lever for tilting the head at the opposite direction and strengthening the user's back.

Any one or more of the following features, designs and configurations can be incorporated in the head support unit and the head support assembly of the first aspect of the presently disclosed subject matter, independently or in combination thereof:

The right coupler and left coupler can be articulatable respectively to the right frame member and to the left frame member, and configured for independently arresting the right support post and the left support post, respectively, in a manner also facilitating selectively sliding displacement of the support post along a longitudinal axis thereof. This sliding displacement can also assist in bringing the head support unit as close as possible to the user's head before lifting it up, and provides an additional degree of freedom.

Each one of the right coupler and the left coupler can comprise a mounting member articulable to the respective right and left frame member, and a post receiving member configured for arresting the respective right and left support post and being pivotable with respect to the mounting member for facilitating the tilting of the support post about the pitch axis.

The mounting member can be articulable to the respective right and left frame member in a manner facilitating rotational displacement of the respective support post about a roll axis of the respective frame member.

The mounting member can comprise an embracing portion configured for performing the articulation by embracing its respective right and left frame member, and the embracing portion can comprise a tension mechanism configured for controlling the tension applied by the embracing portion on the respective tight and left frame member for controlling the ability to perform the rotational displacement of the respective support post with respect to the respective right and left frame member.

In some embodiments, the embracing portion is in the shape of a bridge and is shaped and sized to fit over the frame member together with a portion of the coupler. One side of the bridge may be pivotally coupled to the coupler to allow switching between an embracing state, in which the bridge interface with the coupler at its two sides, and an open state, in which the bridge is in pivotal position that allows removal or insertion of the frame member into an embracing area defined between the frame member and the embracing portion.

The embracing portion may be configured to receive size adapter elements to reduce the size of the embracing area to allow adaptively fitting to different sizes of frame members.

The pivoting of the post receiving member with respect to the mounting member, and the rotational displacement of the mounting member with respect to the respective right and left frame member, can be configured to be performed simultaneously for facilitating displacement of the respective support post about both of the pitch axis and the roll axis.

At least one of the right coupler and the left coupler can comprise a main angle fixing mechanism configured, upon the tilting, for selectively arresting the angular position of the mounting member with respect to the post receiving member, thereby fixing a tilt angle between the respective support post and a backrest plane defined by a backrest of the seat.

The post receiving member can comprise a height fixing mechanism configured for selectively arresting the respective support post at different positions thereof with respect to the post receiving member along the longitudinal axis.

The main angle fixing mechanism and the height fixing mechanism can be disposed at opposite sides of the respective coupler.

The head support unit can comprise a right attachment element articulable to the right top portion, a left attachment element articulable to the left top portion, and a support body disposed between the right attachment element and the left attachment element. The support body can be twistable with respect to at least one of said right attachment element and said left attachment element.

The right attachment element and the left attachment element can be disposed at opposite sides of the support body via a right extending element and a left extending element, respectively. At least one of said right attachment element and said left attachment element can be pivotally connected to its respective extending element for facilitating said twist of the support body with respect to the respective one of the right attachment element and left attachment element.

The right attachment element and the left attachment element can be pivotally connected to the right extending element and the left extending element, respectively, so as to allow independent pivotal displacement thereof.

In some embodiments, each of the attachment elements is rotatable about a horizontal axis that is normal to the longitudinal axis of the posts. The rotation is allowed due to the pivotal coupling of each of the attachment to the respective top portion. More specifically, each of the attachment elements is pivoted on an axle extending from the respective extending element through the respective attachment element and to the support body. In other words, the attachment elements are sandwiched between the respective support body and extending element, and a common axle is fixed to the respective support body and extending element while passing through the respective attachment element, allowing its rotation about an axis defined by said axle. Each attachment element may rotate independent to the other. In some embodiments, the rotation of the attachment element is enabled for up to 180°.

The head support assembly can further comprises at least one auxiliary angle fixing mechanism configured, upon the twisting, for selectively fixing a twist angle between the support body and the respective right support post and left support post.

The head support unit can comprise: an adjustment mechanism configured for selectively adjusting the position of the right attachment element and the left attachment element with respect to each other, by displacing the right extending element and the left extending element, respectively, between a retracted position and an extended position; and a neutralizing mechanism operative with the adjustment mechanism for selectively allowing free displacement of the support body with respect to at least one of the right extending element and the left extending element. The neutralizing mechanism thus enables neutralizing the adjustment mechanism for displacing support body to the right or to the left, and this provides an additional degree of freedom for properly locating support body of the head support unit with respect to the head of the seated user.

The neutralizing mechanism can be switchable between an operative state at which the adjustment mechanism is operative for displacing both of the right extending element and the left extending element, and a fully inoperative state at which the support body is freely displaceable with respect both of the right extending element and the left extending element and irrespectively of the adjustment mechanism.

When the right attachment element and the left attachment element are articulated with the right support post and the left support post, at the fully inoperative state of the neutralizing mechanism, the support body can be freely displaceable towards one of the right extending element and the left extending element and away from another one of the right extending element and the left extending element.

The adjustment mechanism can comprise: right and left drive elements, oppositely disposed to one another along a length of the right extending element and the left side extending element, respectively; and a driving gear comprising a driving portion configured, at the operative state of the neutralizing mechanism, to be engaged with the right and left drive elements and configured, upon rotation of the driving gear, for displacing the right extending element and the left extending element, respectively.

Rotation of the driving gear towards a first direction can entail respective adjustment of the right and left attachment elements towards the extended position, and rotation towards a second opposite direction, can entail respective adjustment of the right and left attachment elements towards the retracted position. The neutralizing mechanism can comprise a neutralizing member configured for axially displacing the driving portion along a rotation axis thereof between an engaged position corresponding to the operative state and at which the driving portion is engaged with the right and left drive elements, and a disengaged position corresponding to the inoperative state and at which the driving portion is disengaged from both right extending element and the left extending element.

The neutralizing member can include the driving portion, and the displacement of the driving portion can be configured to be performed by axial displacement of the neutralizing member.

The driving portion can be a pinion and each one of the right and left drive elements can be a rack.

The neutralizing member can be coaxially disposed within the driving gear.

The adjustment mechanism can be configured to simultaneously adjust the position of both of the right attachment element and the left attachment element.

The simultaneous adjustment of the position of the right attachment element and the left attachment element can be such that the right attachment element and the left attachment element are displaced along the same distance away from each other.

The head support unit further comprises a unit fixing mechanism operative with the adjustment mechanism for selectively fixing the position of the right extending element and the left extending element and preventing the displacement thereof the respect to the support body.

The unit fixing mechanism can be configured to fix the right attachment element and the left attachment element at any one intermediate position from a plurality of intermediate positions between the extended position and the retracted position.

The driving gear can further comprise a latch portion selectively engageable with a locking portion of the support body, the latch portion and the locking portion constitute at least a part of the unit fixing mechanism. The driving gear can be configurable between: a locked state, at which the latch portion is engaged with the locking portion, so as to prevent the driving gear from rotation; and an unlocked state, at which the latch portion is disengaged from the locking portion, so as to enable rotation of the driving gear and respective adjustment of the position of the right attachment element and the left attachment element with respect to each other.

The support body can have a longitudinal axis, and the position of the right attachment element and the left attachment element with respect to each other can be linearly adjustable along the longitudinal axis.

The adjustment mechanism and the neutralizing mechanism can extend at least partially within the support body.

In summary, the head support assembly of the first aspect can have the following five independent displacement mechanisms, allowing changing the spatial position and orientation of the head support unit and its support body at five different and independent degrees of freedom:

the first displacement mechanism, provided by the pivotal rotation of the post receiving members with respect to the mounting members, allows tilting the support posts about the pitch axis;

the second displacement mechanism, provided by the rotational displacement of the mounting members with respect to the respective right and left frame members, allows tilting the support posts and about their respective roll axes;

the third displacement mechanism, provided by the height fixing mechanisms, allows slidingly displacing the support posts along their respective longitudinal axes; In some embodiments, the support posts are telescopic making the assembly more compact and efficient for storage and transportation. Therefore, the support posts can be folded to a minimal size, in which a maximal portion of the length of the support posts is stored within the telescopic portion and can be extended to a maximal size, in which all portions of the support posts are extended outside the telescopic portion.

the fourth displacement mechanism, provided by the neutralizing mechanism, allows displacing the support body along its longitudinal axis without displacing the right and left support posts and their respective right and left extending elements; and the fifth displacement mechanism, provided by the right and left auxiliary angle fixing mechanisms, allows independently twisting the support body with respect to the right attachment element and the left attachment element.

According to a second aspect of the presently disclosed subject matter, there is provided a head support unit for a head support assembly having a right support post and a left support post attachable respectively to a right frame member and a left frame member of a seat, the support unit comprising:

a support body;

a right attachment element and a left attachment element configured for articulation with the right support post and the left support post, respectively, the right attachment element and the left attachment element being disposed at opposite sides of the support body and connected thereto via a right extending element and a left extending element, respectively;

an adjustment mechanism configured for selectively adjusting the position of the right attachment element and the left attachment element with respect to each other, by displacing the right extending element and the left extending element, respectively, between a retracted position and an extended position; and a neutralizing mechanism operative with the adjustment mechanism for selectively allowing free displacement of the support body with respect to at least one of the right extending element and the left extending element.

The right support post and the left support post typically extend vertically upwards in parallel to each other, defining a certain distance therebetween. When the right support post and the left support post are attached to the right and left frame members, the distance therebetween is dictated by the width of the seat, and in particular, by the structure and the distance between the right and left frame members of the seat. This distance can change from one seat to another, or be dependent on the locations at which the right and left posts are articulated to the side frame of a particular seat. Thus, the right attachment element and the left attachment element are adjustable with respect to each other by the adjustment mechanism in order to detachably attach the head support unit to the right and left support posts. Also, the right attachment element and the left attachment element are adjustable to fit the distance therebetween to the distance between the right support post and the left support post being attached the right and left frame members. This adjustment can enable the right attachment element and said left attachment to assume any one intermediate position from a plurality of intermediate positions, or any one discrete predetermined position from a plurality of discrete predetermined positions between the extended position and the retracted position.

When articulated to the top end portion of the support posts, the support unit can be configured for providing support for a head of a user seated on the seat, as described above with respect to the first aspect of the presently disclosed subject matter.

The neutralizing mechanism of the second aspect is configured to be used when the head of the user is tilted downwards to the right or to the left, and there is a need to align the support body with the head and position it behind the tilted head. The neutralizing mechanism thus provides a degree of freedom for moving the support body to the right or to the left, in order to position the support body as close as possible to the head of the user, with a minimal need to manually lift and centralize the head of the user by an operator upon mounting the head to the support body.

Any one or more of the following features, designs and configurations can be incorporated in the head support unit of the second aspect of the presently disclosed subject matter, independently or in combination thereof:

The neutralizing mechanism can be switchable between an operative state at which the adjustment mechanism is operative for displacing both of the right extending element and the left extending element, and a fully inoperative state at which the support body is freely displaceable with respect both of the right extending element and the left extending element and irrespectively of the adjustment mechanism.

When the right attachment element and the left attachment element are articulated with the right support post and the left support post, at the fully inoperative state of the neutralizing mechanism, the support body can be freely displaceable towards one of the right extending element and the left extending element and away from another one of the right extending element and the left extending element.

The adjustment mechanism can comprise: right and left drive elements, oppositely disposed to one another along a length of the right extending element and the left side extending element, respectively; and a driving gear comprising a driving portion configured, at the operative state of the neutralizing mechanism, to be engaged with the right and left drive elements and configured, upon rotation of the driving gear, for displacing the right extending element and the left extending element, respectively.

Rotation of the driving gear towards a first direction can entail respective adjustment of the right and left attachment elements towards the extended position, and rotation towards a second opposite direction, can entail respective adjustment of the right and left attachment elements towards the retracted position.

The neutralizing mechanism can comprise a neutralizing member configured for axially displacing the driving portion along a rotation axis thereof between an engaged position corresponding to the operative state and at which the driving portion is engaged with the right and left drive elements, and a disengaged position corresponding to the inoperative state and at which the driving portion is disengaged from both of the right extending element and the left extending element.

The neutralizing member can include the driving portion, and the displacement of the driving portion can be configured to be performed by axial displacement of the neutralizing member.

The driving portion can be a pinion and each one of the right and left drive elements can be a rack.

The neutralizing member can be coaxially disposed within the driving gear.

The adjustment mechanism can be configured to simultaneously adjust the position of both of the right attachment element and the left attachment element.

The simultaneous adjustment of the position of the right attachment element and the left attachment element can be such that the right attachment element and the left attachment element are displaced along the same distance away from each other.

The head support unit can further comprise a unit fixing mechanism operative with the adjustment mechanism for selectively fixing the position of the right extending element and the left extending element and preventing the displacement thereof with respect to the support body.

The unit fixing mechanism can be configured to fix the right attachment element and the left attachment element at any one intermediate position from a plurality of intermediate positions between the extended position and the retracted position.

The driving gear can further comprise a latch portion selectively engageable with a locking portion of the support body, the latch portion and the locking portion constitute at least a part of the unit fixing mechanism. The driving gear can be configurable between: a locked state, at which the latch portion is engaged with the locking portion, so as to prevent the driving gear from rotation; and an unlocked state, at which the latch portion is disengaged from the locking portion, so as to enable rotation of the driving gear and respective adjustment of the position of the right attachment element and the left attachment element with respect to each other.

The support body can have a longitudinal axis, and the position of the right attachment element and the left attachment element with respect to each other can be linearly adjustable along the longitudinal axis.

The adjustment mechanism and the neutralizing mechanism can extend at least partially within the support body.

As least one of the right attachment element and the left attachment element can be pivotally connected to its respective extending element for facilitating said twist of the support body with respect to the respective one of the right attachment element and left attachment element.

The head support unit further comprises at least one auxiliary angle fixing mechanism configured, upon said twisting, for selectively fixing a twist angle between the support body and the respective right support post and left support post.

The head support unit can be configured to receive a headrest member that comprises a central portion and two side portions. The two side portions are foldable with respect to the central portion so as to allow the headrest member to assume a first state in which the side portions are spaced from each other at a first extent and a second state in which the side portions are spaced from each other to a second extent which is smaller than said first extent.

The headrest member can be detachably attachable to the head support unit, e.g. by fitting an attachment tab into an insertable slit that is formed in the head support unit or by Velcro attachment to the head support unit.

In some embodiments, the headrest member further comprises a restraining member attached to said side portions and configured for rotation at least between an upward position and a downward position, wherein upon being in said downward position the restraining member is configured to support a subject's forehead of a head of a subject that is supported by the head supporting unit.

In some embodiments, displacement of the restraining member between its upward position and its downward position is configured to cause the headrest member to assume its first and second states, respectively.

In some embodiments, the head support unit comprises corresponding head support unit side portions, which are rotatable about axes that are parallel to the longitudinal axis. The head support unit side portions are typically rigid, and the side portions of the headrest member are configured to be attached to or fit over said head support unit side portions such that the side portions of the headrest member and the head support unit side portions fold together, when they are coupled. Namely, the side portions of the headrest member are associated with or fit over the side portions of the head support unit such that any movement of one of them results in the movement of the other.

The head support unit comprises a locking mechanism for selectively allowing to either (i) locking each of the head support unit side portions, independently, at a desired folding position, irrespective to the rotational movement of the restraining member or any other element. It is to be noted that each side portion may be adjusted to a different folding position; or (ii) free movement of the side portions. Thus, for example, the side portions are free to move in result to rotational movement of the restraining member causing the side portions to fold to various extents.

In some embodiments the locking mechanism may be embedded in the headrest member for selectively allowing (i) locking each of the side portions of the headrest member, independently, at a desired folding position, or (ii) free movement of said side portions.

It is to be noted that in some embodiments, each side portion, either of the headrest member or of the head support unit may have its own locking mechanism that independently selectively control the movement profile of its respective side portion, namely whether it is locked at a certain folding position or allowing its free folding movement.

In some embodiments, said central portion comprises a central cushion and each side portion comprises a respective side cushion foldable therewith. The side cushions are separated from the central cushions to allow the folding of the side portion, namely the gap between the central and the side cushions generally serves as the axis or the folding portion about which the folding of the side portions is carried out.

In some embodiments, the central cushion protrudes from a central surface defined by the central portion and the side cushions protrude from side surfaces defined by the side portions, wherein the side cushions protrude to an extent greater than the central cushion.

In some embodiments, the central cushion comprises a first, upper, portion that protrudes to a first extent from said central surface and a second, lower, portion that protrudes to a second extent from said central surface, said second extent is greater than the first extent. The central cushion has a profile that matches the contour of the occipital bone. Thus, the lower portion of the cushion is thicker than the upper portion of the cushion.

In some embodiments, the central portion comprises a pair of supporting cushions, each member of the pair is located at a different side of the central cushion and spaced apart therefrom. The supporting cushions are disposed at the two sides of the lower portion of the central cushion to provide additional peripheral support to the occipital bone of the subject.

In some embodiments, each cushion of the pair protrudes from said central surface to a third extent, greater than the second extent.

It is to be noted that the cushions of the headrest member in any of the above-described embodiments may be detachably attached to the respective portion of the headrest member, i.e. either to the central portion or one of the side portions. This may be carried out, for example, by Velcro attachment. Therefore, for each individual that may use the headrest member, a personalized cushions system may be created, and the headrest member is configured to receive the personalized cushions system of the individual using it.

In some embodiments, the head support assembly further comprising a chin support unit detachably coupled to the headrest member, e.g. by Velcro.

Another aspect of the present disclosure provides a head support unit couplable to a head support assembly of any one of the above-described embodiments. The head support unit comprising a head support unit central portion for resting a head of a subject and a coupling arrangement, e.g. by screws in several screwing positions, for allowing coupling to the head support assembly. The head support unit includes two head support unit side portions, each is independently foldable about a longitudinal axis along a range of folding positions with respect to the central portion, between a closed folding position and an opened folding position.

In some embodiments, the head support unit further includes a locking mechanism for allowing to selectively switch between two states—(i) locking each of the head support unit side portions, independently, at a desired folding position; or (ii) free movement of the side portions.

In some embodiments of the head support unit, each side portion of the head support unit comprises its own respective locking mechanism. Yet another aspect of the present disclosure provides a headrest member receivable in a head support unit of a head support assembly. The head support unit is a part of a head support assembly that is configured to be coupled to a wheelchair. The head support unit is made of rigid materials and the headrest member is made of soft materials allowing portions thereof to be folded during the use thereof. The headrest member comprising a central portion and two side portions, wherein the two side portions are foldable with respect to the central portion so as to allow the headrest member to assume a first state in which the side portions are spaced from each other at a first extent and a second state in which the side portions are spaced from each other to a second extent which is smaller than said first extent. The headrest member is detachably attachable to the head support unit, e.g. by fitting an attachment tab into an insertable slit that is formed in the head support unit or by Velcro attachment to the head support unit. The head support unit comprises corresponding head support unit side portions, typically, the head support unit side portions are rigid. The side portions of the headrest member fit over the head support unit side portions such that the head support unit side portions and the side portions of the headrest member fold together. The head support unit side portions are rotatable about parallel longitudinal axes, and the side portions of the headrest member are associated with or fit over the side portions of the head support unit such that any movement of one of them results in the movement of the other.

In some embodiments, the headrest member further comprising a restraining member attached to said side portions and configured for rotation at least between an upward position and a downward position, wherein upon being in said downward position the restraining member is configured to support a subject's forehead of a head of a subject that is supported by the head supporting unit.

In some embodiments, the displacement of the restraining member between its upward position and its downward position is configured to cause the headrest member to assume its first and second states, respectively.

In some embodiments, the headrest member further comprising a locking mechanism for selectively allowing: (i) locking each of the side portions of the headrest member, independently, at a desired folding position, irrespective to the rotational movement of the restraining member or any other element. Each side portion may be adjusted to a different folding position independent to the other; or (ii) free movement of the side portions.

In some embodiments, each side portion of the headrest member comprises its respective locking mechanism.

In some embodiments, the central portion comprises a central cushion and each side portion comprises a respective side cushion foldable therewith. The side cushions are separated from the central cushions to allow the folding of the side portion, namely the gap between the central and the side cushions generally serves as the axis about which the folding of the side portions is carried out.

In some embodiments, the central cushion protrudes from a central surface defined by the central portion and the side cushions protrude from side surfaces defined by the side portions, wherein the side cushions protrude to an extent greater than the central cushion.

In some embodiments, the central cushion comprises a first, upper, portion that protrudes to a first extent from said central surface and a second, lower, portion that protrudes to a second extent from said central surface, said second extent is greater than the first extent. The central cushion has a profile that matches the contour of the occipital bone. Thus, the lower portion of the cushion is thicker than the upper portion of the cushion.

In some embodiments, the central portion comprises a pair of supporting cushions, each member of the pair is located at a different side of the central cushion and spaced apart therefrom. The supporting cushions are disposed at the two sides of the lower portion of the central cushion to provide additional peripheral support to the occipital bone of the subject.

In some embodiments, each cushion of the pair protrudes from said central surface to a third extent, greater than the second extent.

In some embodiments, the headrest member further comprising a chin support unit detachably coupled to the headrest member, e.g. by Velcro.

EMBODIMENTS

The following are various non-limiting embodiments of different aspects of the present disclosure:

1. A head support assembly attachable to a seat comprising a right frame member and a left frame member, the head support assembly comprising:
   a right support post and a left support post;
   a right coupler and a left coupler, articulatable respectively to the right frame member and to the left frame member, and configured for independently arresting the right support post and the left support post, respectively, in a manner facilitating tilting the support post at least partially about a pitch axis extending between the right coupler and the left coupler; and
   a head support unit articulable to a right top portion of the right support post and to a left top portion of the left support post.

2. The head support assembly of Embodiment 1, wherein said right coupler and left coupler, are articulatable respectively to the right frame member and to the left frame member, and configured for independently arresting the right support post and the left support post, respectively, in a manner also facilitating selectively sliding displacement of the support post along a longitudinal axis thereof.

3. The head support assembly of Embodiment 1 or 2, wherein each one of the right coupler and the left coupler comprises a mounting member articulable to the respective right and left frame member, and a post receiving member configured for arresting the respective right and left support post and being pivotable with respect to the mounting member for facilitating the tilting of the support post about the pitch axis.

4. The head support assembly of Embodiment 3, wherein said mounting member is articulable to the respective right and left frame member in a manner facilitating rotational displacement of the respective support post about a roll axis of the respective frame member.

5. The head support assembly of Embodiment 4, wherein said mounting member comprises an embracing portion configured for performing said articulation by embracing its respective right and left frame member, and wherein the embracing portion comprises a tension mechanism configured for controlling the tension applied by the embracing portion on the respective tight and left frame member for controlling the ability to perform the rotational displacement of the respective support post with respect to the respective right and left frame member.

6. The head support assembly of Embodiment 4 or 5, when dependent on claim 2, wherein the pivoting of the post receiving member with respect to the mounting member, and the rotational displacement of the mounting member with respect to the respective right and left frame member, are configured to be performed simultaneously for facilitating displacement of the respective support post about both of said pitch axis and said roll axis.

7. The head support assembly of any one of Embodiments 3 to 6, wherein at least one of the right coupler and the left coupler comprises a main angle fixing mechanism configured, upon said tilting, for selectively arresting the angular position of the mounting member with respect to the post receiving member, thereby fixing a tilt angle between the respective support post and a backrest plane defined by a backrest of the seat.

8. The head support assembly of any one of Embodiments 3 to 7, wherein said post receiving member comprises a height fixing mechanism configured for selectively arresting the respective support post at different positions thereof with respect to the post receiving member along said longitudinal axis.

9. The head support assembly of 8, when dependent on Embodiment 7, wherein said main angle fixing mechanism and said height fixing mechanism are disposed at opposite sides of the respective coupler.

10. The head support assembly of any one of the preceding Embodiments, wherein said head support unit comprises a right attachment element articulable to the right top portion, a left attachment element articulable to the left top portion, and a support body disposed between the right attachment element and the left attachment element; and wherein the support body is twistable with respect to at least one of said right attachment element and said left attachment element.

11. The head support assembly of Embodiment 10, wherein the right attachment element and the left attachment element are disposed at opposite sides of the support body via a right extending element and a left extending element, respectively; and wherein at least one of said right attachment element and said left attachment element is pivotally connected to its respective extending element for facilitating said twist of the support body with respect to the respective one of the right attachment element and left attachment element.

12. The head support assembly of Embodiment 11, wherein said right attachment element and said left attachment element are pivotally connected to said right extending element and said left extending element, respectively, so as to allow independent pivotal displacement thereof.

13. The head support assembly of any one of Embodiments 10 to 12, wherein said head support assembly further comprises at least one auxiliary angle fixing mechanism configured, upon said twisting, for selectively fixing a twist angle between the support body and the respective right support post and left support post.

14. The head support assembly of any one of Embodiments 10 to 13, when dependent on claim 11, wherein said head support unit comprises an adjustment mechanism configured for selectively adjusting the position of the right attachment element and the left attachment element with respect to each other, by displacing said right extending element and said left extending element, respectively, between a retracted position and an extended position; and a neutralizing mechanism operative with said adjustment mechanism for selectively allowing free displacement of the support body with respect to at least one of said right extending element and said left extending element.

15. The head support assembly of Embodiment 14, wherein said neutralizing mechanism is switchable between an operative state at which said adjustment mechanism is operative for displacing both of said right extending element and said left extending element, and a fully inoperative state at which the support body is freely displaceable with respect both of said right extending element and said left extending element and irrespectively of said adjustment mechanism.

16. The head support assembly of Embodiment 15, wherein, when the right attachment element and the left attachment element are articulated with the right support post and the left support post, at the fully inoperative state of the neutralizing mechanism, the support body is freely displaceable towards one of the right extending element and said left extending element and away from another one of the right extending element and said left extending element.

17. The head support assembly of Embodiment 15 or 16, wherein the adjustment mechanism comprises: right and left drive elements, oppositely disposed to one another along a length of the right extending element and the left side extending element, respectively; and a driving gear comprising a driving portion configured, at said operative state of the neutralizing mechanism, to be engaged with the right and left drive elements and configured, upon rotation of the driving gear, for displacing said right extending element and said left extending element, respectively.

18. The head support assembly of Embodiment 17, wherein rotation of the driving gear towards a first direction entails respective adjustment of said right and left attachment elements towards the extended position, and rotation towards a second opposite direction, entails respective adjustment of said right and left attachment elements towards the retracted position.

19. The head support assembly of claim 17 or 18, wherein said neutralizing mechanism comprises a neutralizing member configured for axially displacing said driving portion along a rotation axis thereof between an engaged position corresponding to said operative state and at which said driving portion is engaged with the right and left drive elements, and a disengaged position corresponding to said inoperative state and at which said driving portion is disengaged from both of said right extending element and said left extending element.

20. The head support assembly of Embodiment 19, wherein said neutralizing member includes said driving portion, and said displacement of the driving portion is configured to be performed by axial displacement of the neutralizing member.

21. The head support assembly of any one of Embodiment 17 to 20, wherein the driving portion is a pinion and each one of said right and left drive elements is a rack.

22. The head support assembly of Embodiment 19, wherein said neutralizing member is coaxially disposed within said driving gear.

23. The head support assembly of any one of Embodiment 15 to 22, wherein the adjustment mechanism is configured to simultaneously adjust the position of both of the right attachment element and the left attachment element.

24. The head support assembly of Embodiment 23, wherein the simultaneous adjustment of the position of the right attachment element and the left attachment element is such that the right attachment element and the left attachment element are displaced along the same distance away from each other.

25. The head support assembly of any one of Embodiments 15 to 24, wherein said head support unit further comprises a unit fixing mechanism operative with said adjustment mechanism for selectively fixing the position of the right extending element and said left extending element and preventing the displacement thereof with respect to the support body.

26. The head support assembly of Embodiment 25, wherein said unit fixing mechanism configured to fix said right attachment element and said left attachment element at any one intermediate position from a plurality of intermediate positions between the extended position and the retracted position.

27. The head support assembly of Embodiment 25 or 26, wherein the driving gear further comprises a latch portion selectively engageable with a locking portion of the support body, said latch portion and said locking portion constitute at least a part of the unit fixing mechanism; and wherein the driving gear is configurable between: a locked state, at which the latch portion is engaged with the locking portion, so as to prevent the driving gear from rotation; and an unlocked state, at which the latch portion is disengaged from the locking portion, so as to enable rotation of the driving gear and respective adjustment of the position of the right attachment element and the left attachment element with respect to each other.

28. The head support assembly of any one of Embodiments 15 to 27, wherein the support body has a longitudinal axis, and the position of the right attachment element and the left attachment element with respect to each other is linearly adjustable along said longitudinal axis.

29. The head support assembly of any one of Embodiments 15 to 28, wherein the adjustment mechanism and the neutralizing mechanism extend at least partially within the support body.

30. The head support assembly of any one of Embodiments 1 to 29, wherein the head support unit is configured to receive a headrest member that comprises a central portion and two side portions, wherein the two side portions are foldable with respect to the central portion so as to allow the headrest member to assume a first state in which the side portions are spaced from each other at a first extent and a second state in which the side portions are spaced from each other to a second extent which is smaller than said first extent.

31. The head support assembly of Embodiment 30, wherein said headrest member is detachably attachable to the head support unit.

32. The head support assembly of Embodiment 30 or 31, wherein the headrest member further comprises a restraining member attached to said side portions and configured for rotation at least between an upward position and a downward position, wherein upon being in said downward position the restraining member is configured to support a subject's forehead of a head of a subject that is supported by the head supporting unit.

33. The head support assembly of Embodiment 32, wherein displacement of the restraining member between its upward position and its downward position is configured to cause the headrest member to assume its first and second states, respectively.

34. The head support assembly of any one of Embodiments 30 to 33, wherein the head support unit comprises corresponding head support unit side portions, the side portions of the headrest member are configured to be attached to or fit over said head support unit side portions such that the side portions of the headrest member and the head support unit side portions fold together.

35. The head support assembly of Embodiments 34, wherein the head support unit comprises a locking mechanism for allowing (i) locking each of the head support unit side portions, independently, at a desired folding position or (ii) free movement of the side portions.

36. The head support assembly of Embodiment 34 or 35, wherein each side portion of the head support unit comprises its respective locking mechanism.

37. The head support assembly of any one of Embodiments 30 to 36, wherein said central portion comprises a central cushion and each side portion comprises a respective side cushion.

38. The head support assembly of Embodiment 37, wherein the central cushion protrudes from a central surface defined by the central portion and the side cushions protrude from side surfaces defined by the side portions, wherein the side cushions protrude to an extent greater than the central cushion.

39. The head support assembly of Embodiment 37 or 38, wherein the central cushion comprises a first portion that protrudes to a first extent from said central surface and a second portion that protrudes to a second extent from said central surface, said second extent is greater than the first extent.

40. The head support assembly of any one of claims 37 to 39, the central portion comprises a pair of supporting cushions, each member of the pair is located at a different side of the central cushion and spaced apart therefrom.

41. The head support assembly of Embodiment 40, wherein each cushion of the pair protrudes from said central surface to a third extent, greater than the second extent.

42. The head support assembly of Embodiment 41, comprising a chin support unit detachably coupled to the headrest member.

43. A head support unit for a head support assembly having a right support post and a left support post attachable respectively to a right frame member and a left frame member of a seat, said support unit comprising:
  a support body;
  a right attachment element and a left attachment element configured for articulation with said right support post and said left support post, respectively, said right attachment element and said left attachment element being disposed at opposite sides of the support body and connected thereto via a right extending element and a left extending element, respectively;
  an adjustment mechanism configured for selectively adjusting the position of the right attachment element and the left attachment element with respect to each other, by displacing said right extending element and said left extending element, respectively, between a retracted position and an extended position; and
  a neutralizing mechanism operative with said adjustment mechanism for selectively allowing free displacement of the support body with respect to at least one of said right extending element and said left extending element.

44. The head support unit of Embodiment 43, wherein said neutralizing mechanism is switchable between an operative state at which said adjustment mechanism is operative for displacing both of said right extending element and said left extending element, and a fully inoperative state at which the support body is freely displaceable with respect both of said right extending element and said left extending element and irrespectively of said adjustment mechanism.

45. The head support unit of Embodiment 44, wherein, when the right attachment element and the left attachment element are articulated with the right support post and the left support post, at the fully inoperative state of the neutralizing mechanism, the support body is freely displaceable towards one of the right extending element and said left extending element and away from another one of the right extending element and said left extending element.

46. The head support unit of Embodiment 44 or 45, wherein the adjustment mechanism comprises: right and left drive elements, oppositely disposed to one another along a length of the right extending element and the left side extending element, respectively; and a driving gear comprising a driving portion configured, at said operative state of the neutralizing mechanism, to be engaged with the right and left drive elements and configured, upon rotation of the driving gear, for displacing said right extending element and said left extending element, respectively.

47. The head support unit of Embodiment 46, wherein rotation of the driving gear towards a first direction entails respective adjustment of said right and left attachment elements towards the extended position, and rotation towards a second opposite direction, entails respective adjustment of said right and left attachment elements towards the retracted position.

48. The head support unit of Embodiment 46 or 47, wherein said neutralizing mechanism comprises a neutralizing member configured for axially displacing said driving portion along a rotation axis thereof between an engaged position corresponding to said operative state and at which said driving portion is engaged with the right and left drive elements, and a disengaged position corresponding to said inoperative state and at which said driving portion is disengaged from both of said right extending element and said left extending element.

49. The head support unit of Embodiment 48, wherein said neutralizing member includes said driving portion, and said displacement of the driving portion is configured to be performed by axial displacement of the neutralizing member.

50. The support unit of any one of Embodiments 46 to 49, wherein the driving portion is a pinion and each one of said right and left drive elements is a rack.

51. The head support unit of Embodiment 50, wherein said neutralizing member is coaxially disposed within said driving gear.

52. The head support unit of any one of Embodiments 45 to 51, wherein the adjustment mechanism is configured to simultaneously adjust the position of both of the right attachment element and the left attachment element.

53. The head support unit of Embodiment 52, wherein the simultaneous adjustment of the position of the right attachment element and the left attachment element is such that the right attachment element and the left attachment element are displaced along the same distance away from each other.

54. The head support unit of any one of Embodiments 43 to 53, further comprising a unit fixing mechanism operative with said adjustment mechanism for selectively fixing the position of the right extending element and said left extending element and preventing the displacement thereof said with respect to the support body.

55. The head support unit of Embodiment 54, wherein said unit fixing mechanism configured to fix said right attachment element and said left attachment element at any one intermediate position from a plurality of intermediate positions between the extended position and the retracted position.

56. The head support unit of Embodiment 54 or 55, wherein the driving gear further comprises a latch portion selectively engageable with a locking portion of the support body, said latch portion and said locking portion constitute at least a part of the unit fixing mechanism; and wherein the driving gear is configurable between: a locked state, at which the latch portion is engaged with the locking portion, so as to prevent the driving gear from rotation; and an unlocked state, at which the latch portion is disengaged from the locking portion, so as to enable rotation of the driving gear and respective adjustment of the position of the right attachment element and the left attachment element with respect to each other.

57. The head support unit of any one of Embodiments 43 to 56, wherein the support body has a longitudinal axis, and the position of the right attachment element and the left attachment element with respect to each other is linearly adjustable along said longitudinal axis.

58. The head support unit of any one of Embodiments 43 to 57, wherein the adjustment mechanism and the neutralizing mechanism extend at least partially within the support body.

59. The head support unit of any one of Embodiments 43 to 58, wherein the support body is twistable with respect to at least one of said right attachment element and said left attachment element.

60. The head support unit of Embodiment 59, wherein at least one of said right attachment element and said left attachment element is pivotally connected to its respective extending element for facilitating said twist of the support body with respect to the respective one of the right attachment element and left attachment element.

61. The head support unit of Embodiment 60, wherein said right attachment element and said left attachment element are pivotally connected to said right extending element and said left extending element, respectively, so as to allow independent pivotal displacement thereof.

62. The head support unit of any one of Embodiments 59 to 61, wherein said head support unit further comprises at least one auxiliary angle fixing mechanism configured, upon said twisting, for selectively fixing a twist angle between the support body and the respective right support post and left support post.

63. The head support unit of any one of Embodiments 44-62, comprising a head support unit central portion for resting a head of a subject thereon, the head support unit central portion comprises a coupling arrangement for allowing coupling to a head support assembly;
the head support unit further comprising two head support unit side portions, each is independently foldable about a longitudinal axis along a range of folding positions with respect to the central portion.

64. The head support unit of Embodiment 63, comprising a locking mechanism for allowing (i) locking each of the head support unit side portions, independently, at a desired folding position or (ii) free movement of the side portions.

65. The head support unit of Embodiment 64, wherein each side portion of the head support unit comprises its respective locking mechanism.

66. A head support unit couplable to a head support assembly, comprising:
a head support unit central portion for resting a head of a subject and comprising a coupling arrangement for allowing coupling to a head support assembly;
two head support unit side portions, each is independently foldable about a longitudinal axis along a range of folding positions with respect to the central portion.

67. The head support unit of Embodiment 66, comprising a locking mechanism for allowing (i) locking each of the head support unit side portions, independently, at a desired folding position or (ii) free movement of the side portions.

68. The head support unit of Embodiment 67, wherein each side portion of the head support unit comprises its respective locking mechanism.

69. A headrest member receivable in a head support unit of any one of claim 64-69, the headrest member comprising:
a central portion and two side portions, wherein the two side portions are foldable with respect to the central portion so as to allow the headrest member to assume a first state in which the side portions are spaced from each other at a first extent and a second state in which the side portions are spaced from each other to a second extent which is smaller than said first extent;
said headrest member is detachably attachable to the head support unit;
wherein the head support unit comprises corresponding head support unit side portions, wherein the side portions of the headrest member fit over the head support unit side portions such that the head support unit side portions and the side portions of the headrest member fold together.

70. The headrest member of Embodiment 69, further comprising a restraining member attached to said side portions and configured for rotation at least between an upward position and a downward position, wherein upon being in said downward position the restraining member is configured to support a subject's forehead of a head of a subject that is supported by the head supporting unit.

71. The headrest member of Embodiment 70, wherein displacement of the restraining member between its upward position and its downward position is configured to cause the headrest member to assume its first and second states, respectively.

72. The headrest member of any one of Embodiments 69 to 71, wherein said central portion comprises a central cushion and each side portion comprises a respective side cushion.

73. The headrest member of Embodiment 72, wherein the central cushion protrudes from a central surface defined by the central portion and the side cushions protrude from side surfaces defined by the side portions.

74. The headrest member of Embodiment 72 or 73, wherein the central cushion comprises a first portion that protrudes to a first extent from said central surface and a second portion that protrudes to a second extent from said central surface, said second extent is greater than the first extent.

75. The headrest member of any one of Embodiments 72 to 74, the central portion comprises a pair of supporting cushions, each member of the pair is located at a different side of the central cushion and spaced apart therefrom.

76. The headrest member of Embodiment 75, wherein each cushion of the pair protrudes from said central surface to a third extent, greater than the second extent.

77. The headrest member of Embodiment 76, comprising a chin support unit detachably coupled to the headrest member.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 6A is a perspective view showing the side portions in an opened state; FIG. 6B is a side view showing the side portions in an opened state; FIG. 6C is a perspective view showing the side portions in a parallel, neutral state; FIG. 6D is a perspective view showing the side portions in an asymmetric state; FIG. 6E is a perspective view showing the side portions in a closed state.

FIG. 7A is a top view; and FIG. 7B is a perspective view.

DETAILED DESCRIPTION OF EMBODIMENTS

Figure 1A:
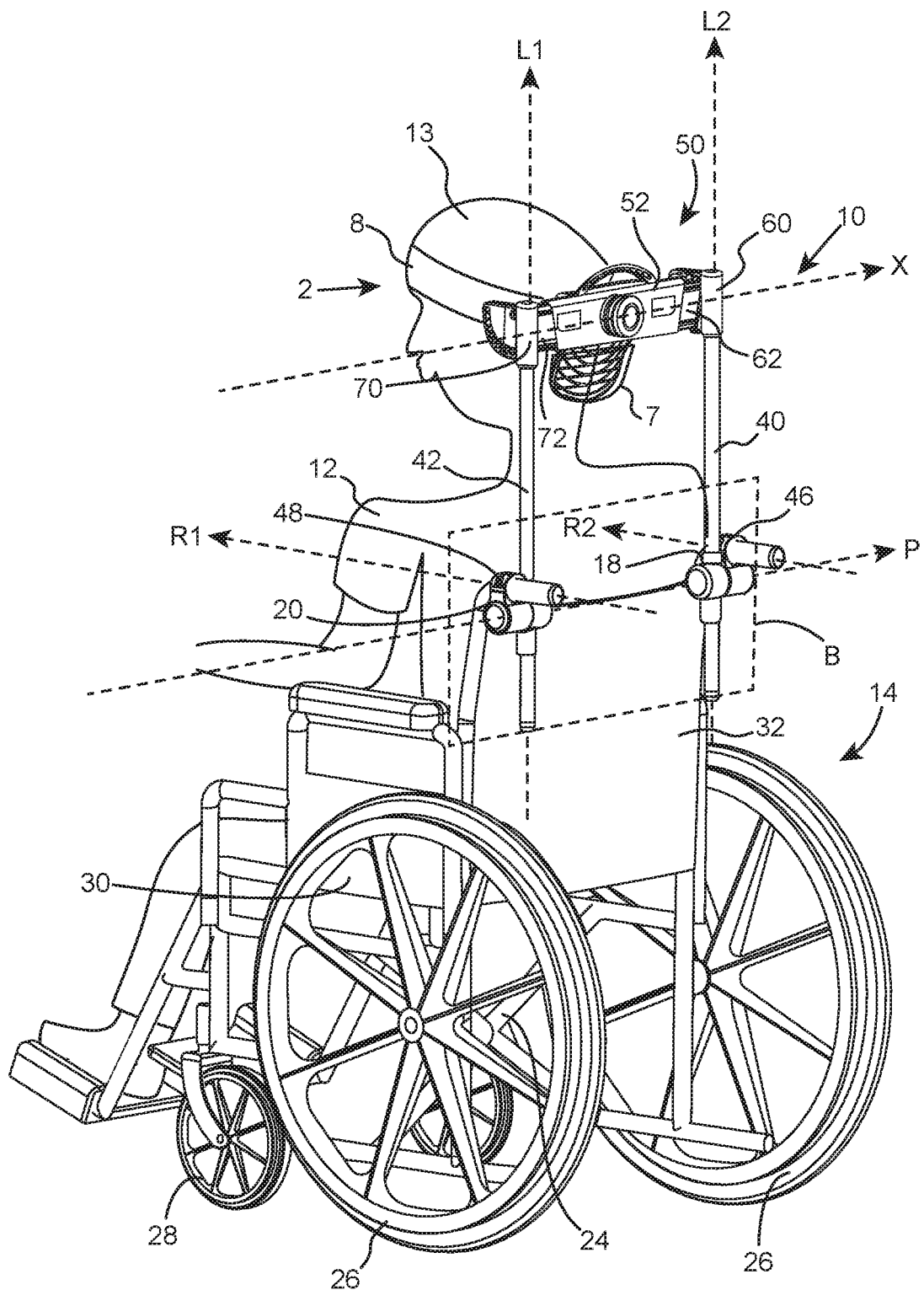
FIG. 1A illustrates a rear perspective view of a foldable wheelchair fitted with a head support assembly having a head support unit, according to one example of the presently disclosed subject matter.

Attention is first made to FIGS. 1A to 1G of the drawings, directed to an example of head support assembly according to the present disclosure, generally designated 10, mounted as an add-on to a seat in the form of a generic type wheelchair, generally designated 14.

The wheelchair 14 is a collapsible wheelchair of the type comprising a right frame member 18 and a left frame member 20 articulated to one another by a collapsible X-shaped cross-frame 24, each side frame mounted over a large rear wheel 26 and a front caster wheel 28, with a foldable seat 30 and a foldable backrest 32 extending between the right frame member 18 and the left frame member 20. Whilst a specific wheelchair is illustrated in the annexed drawings, it is appreciated that other types and shapes of wheelchairs can be used as well.

The head support assembly 10 comprises a pair of support posts, namely a right support post 40 and a left support post 42, articulated to the right frame member 18 by a right coupler 46, and to the left frame member 20 by a left coupler 48, respectively. The right coupler 46 and the left coupler 48 are similar and symmetrical with respect to each other. The right coupler 46 and the left coupler 48 are configured for respectively facilitating sliding displacement of the right support post 40 and the left support post 42 therein between an upper position shown in FIG. 1A and a lower position shown in FIG. 1B, and for fixing the right and left support posts 40 and 42 at any position between the upper position and the lower position, as explained below.

The head support assembly 10 further comprises a head support unit 50 having a support body 52, and a right attachment element 60 and a left attachment element 70 disposed at opposite sides of the support body 52 along a longitudinal axis X. The right attachment element 60 and the left attachment element 70 are articulated at top portions of the right support post 40 and the left support post 42, respectively.

The head support unit 50 is configured for providing support for a head 13 of a user 12 seated on the wheelchair 14. As shown in FIG. 1A, a head restraint 2 is attached to the support body 52 and is disposed at a front of the support body 52. The head restraint 2 is configured for providing improved head and neck support to the user 12 while seated in the wheelchair 14, e.g., in case the user falls asleep or in case of an individual with physical disorders. More particularly, the head restraint 2 is configured for preventing the user's head from falling forward, and furthermore, for preventing the user's head from tilting to the left or the right side. This provides comfortable and stable support of the user's head while sitting on the wheelchair 14.

The head support assembly 10 is also configured to be used for holding the head up in cases in which the sitting user has a dropped head syndrome, or any other disease that effects the neck muscles, like ALS, CP, Parkinsons, Muscular Dystrophy, Kyphosis, Scoliosis, as well as conditions resulting from brain trauma, radiation therapy and even cases of advanced degenerative spinal conditions. The use of the head support assembly can provide to the user comfort, relief of pain, an ability to perform daily activities, the ability for properly breathing and eating.

According to the example of FIG. 1A, the head restraint 2 is the one disclosed in U.S. Pat. No. 9,566,885. The head restraint 2 comprises a pivotable restraining member 8 configured for preventing the head 13 to fall down, and a mounting arrangement 7 for detachably attaching the head restraint 2 to the support body 52. In use, when the head 13 is positioned at the head restraint 2, the restraining member 8 at its upward position can be located substantially above the head 13, and in its downward position, the restraining member 8 is located in front of the user's forehead and supporting the head.

As mentioned in the background of the presently disclosed subject matter, in order to use the head support assembly and the head support unit of WO 2019/207580 in cases in which a sitting user has a dropped head syndrome, or any other disease in which his head is tilted downward, it is required first to manually strengthen the user's head while applying a lot force, and only when the head is positioned correctly in a straight position, the head support unit can be mounted thereto. Moreover, the head support unit is capable of supporting the user's head when the head is centralized, and not aligned to the right or to the left. This manner of operation of the head support assembly and the head support unit of WO 2019/207580 may thus require two or more operators that would have to apply a lot of force in order to strengthen the user's head, and the mounting of the head to the head support unit may cause much discomfort and even pain to the sitting user.

Therefore, as shown in FIGS. 1D to 1G, the head support assembly 10 has a number of position changing mechanisms, as detailed below, configured for spatially positioning and fixing the support body 52 at different angles and orientations at the area above the seat 30, allowing positioning the support body 52 and the head restraint 2 mounted thereto, as close as possible to the head 13 of the user 12. This ability of the head support assembly 10 allows properly treating users with a downwardly tilted and or side tilted head.

Instead of bringing the user's head to the head support unit (as in WO 2019/207580) by lifting and strengthening the head in a manual manner before mounting it to the head support unit, the head support unit 50 is configured to be displaced toward the head of the user. By this operation, upon bringing the head support unit 50 in proximity to the user's head, the head can be mounted to the head support unit, and, if required, the entire head support unit can be tilted at the opposite direction (for example, the position of FIG. 1A) together with the user's head, thereby strengthening the neck and the back of the user, and holding the head up. In this case, bottom portions of the right support post and the left support post can be used as a lever for performing this tilt the head at the opposite direction. Explanations are provided below in order to describe in a detailed manner how the head support unit 50 can be spatially maneuvered to different tilting angles and alignment positions.

The right coupler 46 and the left coupler 48 define a pitch axis P extending therebetween, each one of the left frame member 20 and the right frame member 18, defines a roll axis R1 and R2, respectively, and each one of the support posts 40 and 42 defines its respective longitudinal axis L1 and L2.

The head support assembly 10 has the following five independent displacement mechanisms, allowing changing the spatial position and orientation of the head support unit 50 and its support body 52 at five different and independent degrees of freedom:

the first displacement mechanism allows tilting the support posts 40 and 42 about the pitch axis P;
the second displacement mechanism allows tilting the support posts 40 and 42 about their respective roll axes R1 and R2;
the third displacement mechanism allows slidingly displacing the support posts 40 and 42 along their respective axes L1 and L1;
the fourth displacement mechanism allows displacing the support body 52 along the longitudinal axis X without displacing the right and left support posts; and
the fifth displacement mechanism allows independently twisting the support body 52 with respect to the right attachment element 60 and the left attachment element 70.

Figure 2A:
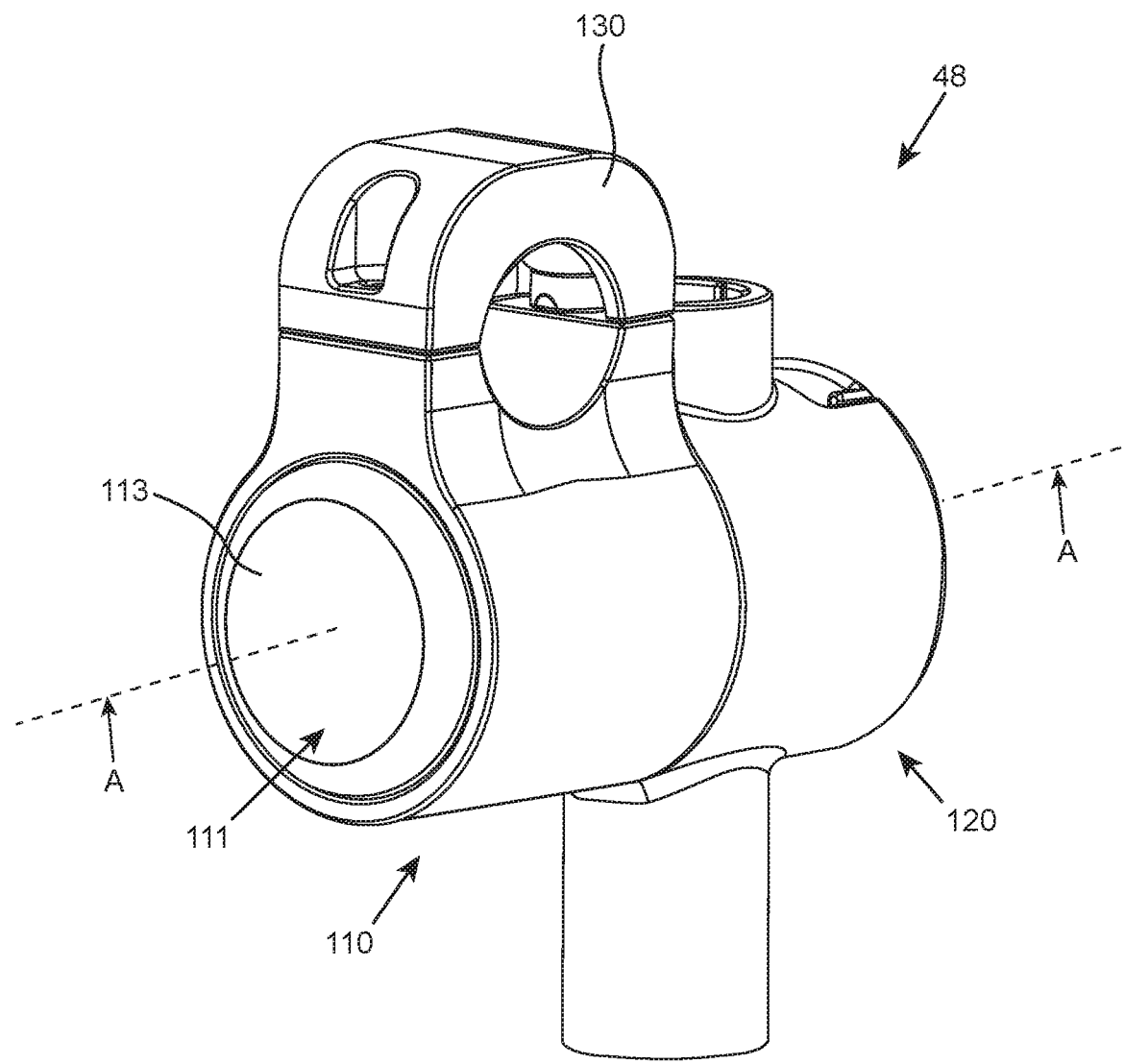
FIG. 2A illustrates a rear perspective view of a left coupler of the head support assembly of FIG. 1A.

The first three displacement mechanisms are related to the structure of each one of the right coupler 46 and the left coupler 48, allowing tilting and displacing the support posts 40 and 42. Reference is thus now made particularly to FIGS. 2A to 2C, in order to describe the structure of one of the couplers, i.e., the left coupler 48.

The left coupler 48 is structured of two parts: a mounting member 110 articulable to the left frame member 20, and a post receiving member 120 configured for arresting the left support post 42. The post receiving member 120 is pivotable with respect to the mounting member 110 for facilitating the tilting of the left support post 42 about the pitch axis P, and providing the first displacement mechanism.

Figure 1B:
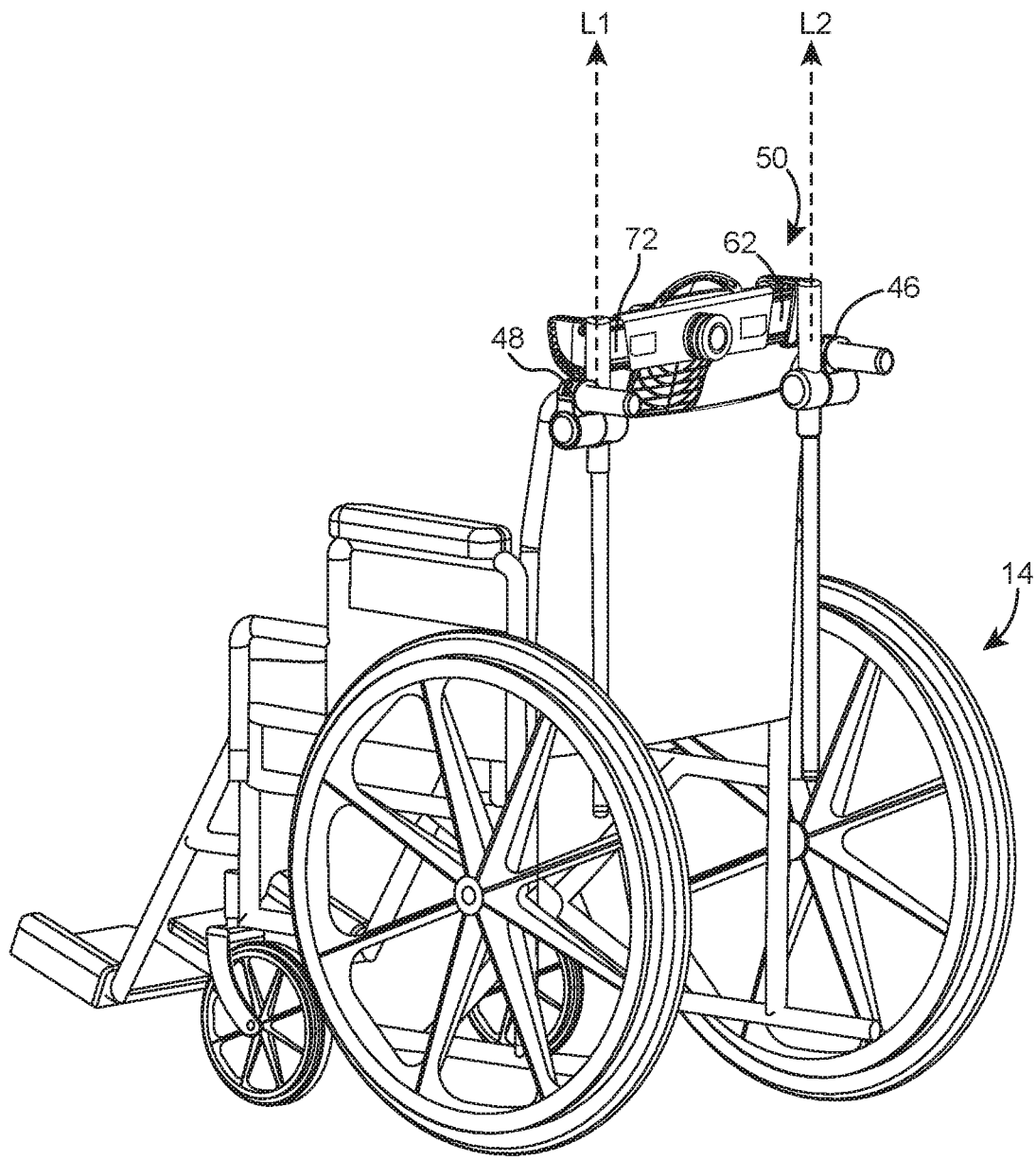
FIG. 1B illustrates the wheelchair of FIG. 1A, with the head support unit at a position lower than in FIG. 1A.
Figure 1C:
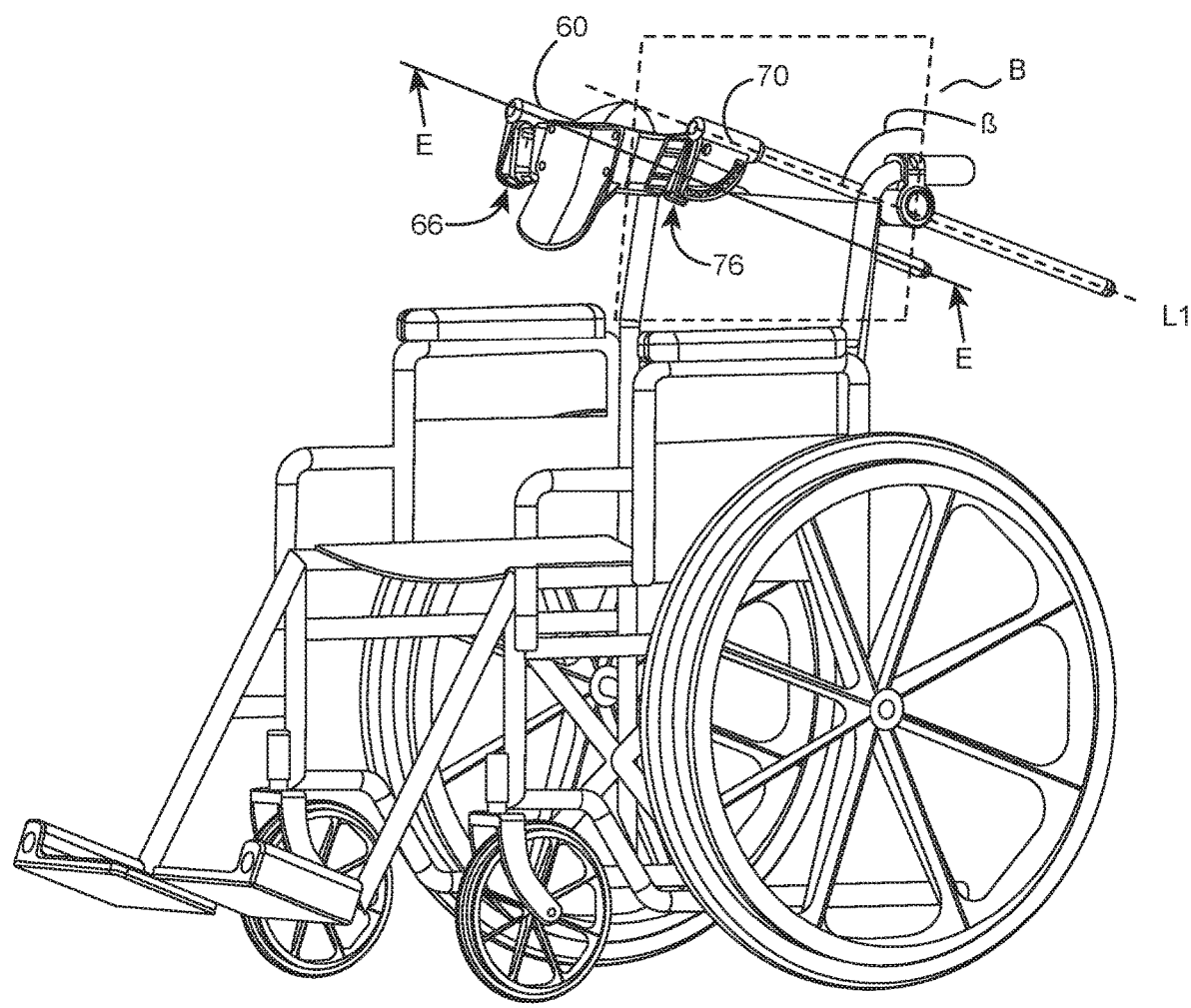
FIG. 1C illustrates the wheelchair of FIG. 1A with a support body of the head support unit being tilted forwardly, aligned to the right and twisted with respect to its right and left attachment elements.

The mounting member 110 is provided with a main angle fixing mechanism 111 configured, upon the tilting of the left support post 42 about the pitch axis P, for selectively arresting the angular position of the mounting member 110 with respect to the post receiving member 120, thereby fixing a tilt angle β between the longitudinal axis L1 left support post 42 and a backrest plane B defined by the backrest 32 of the wheelchair 14 (as shown in FIG. 1C).

Figure 2B:
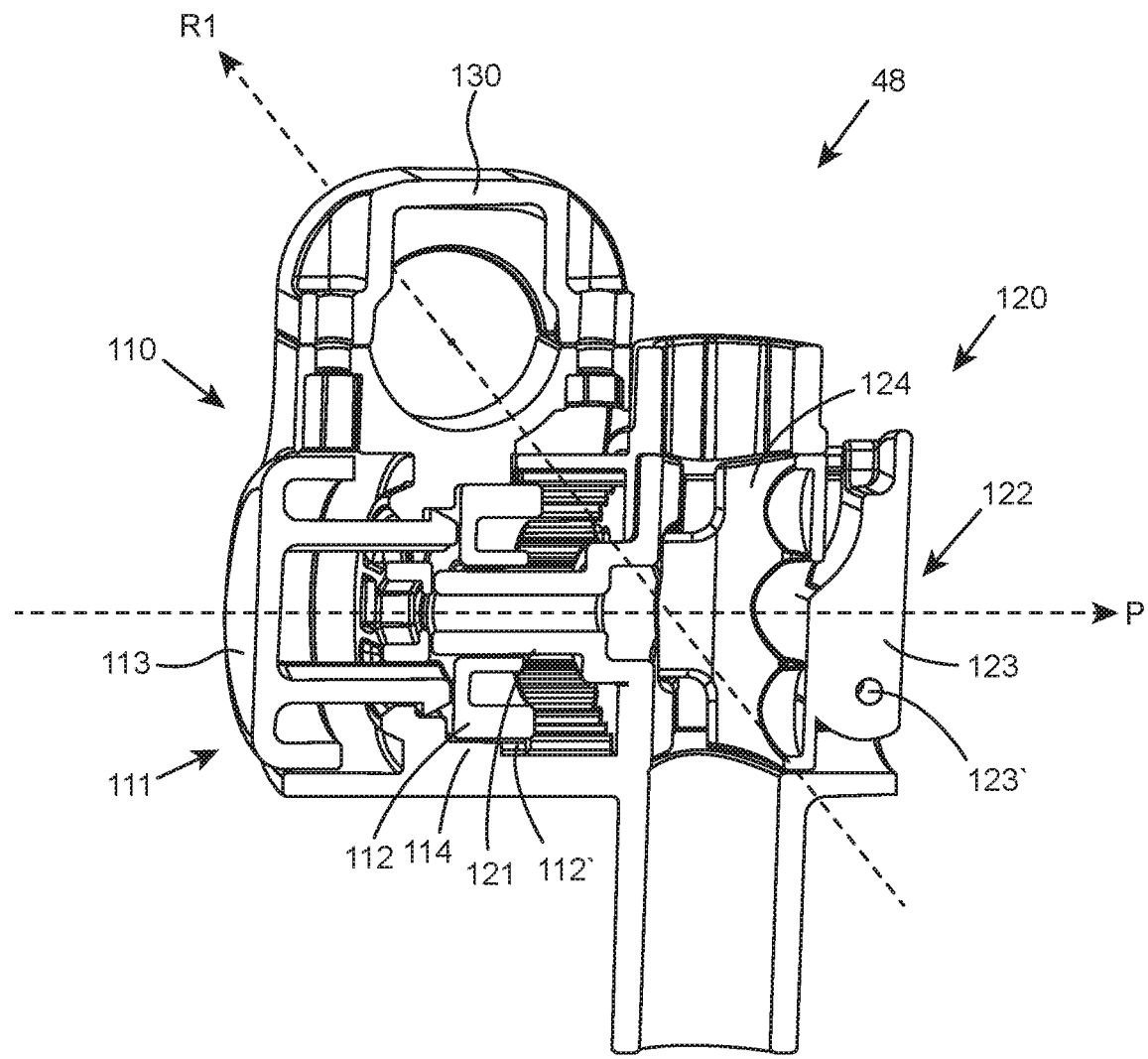
FIG. 2B is a cross-sectional view along line A-A in FIG. 2A.
Figure 2C:
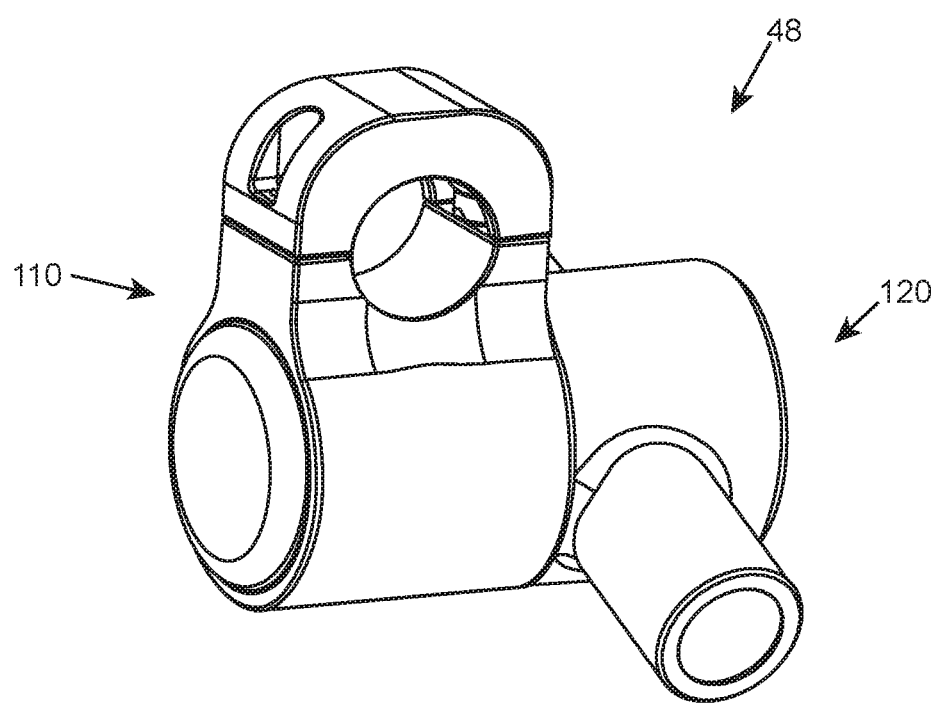
FIG. 2C illustrates a rear perspective view of a left coupler of the head support assembly of FIG. 1E.
Figure 3A:
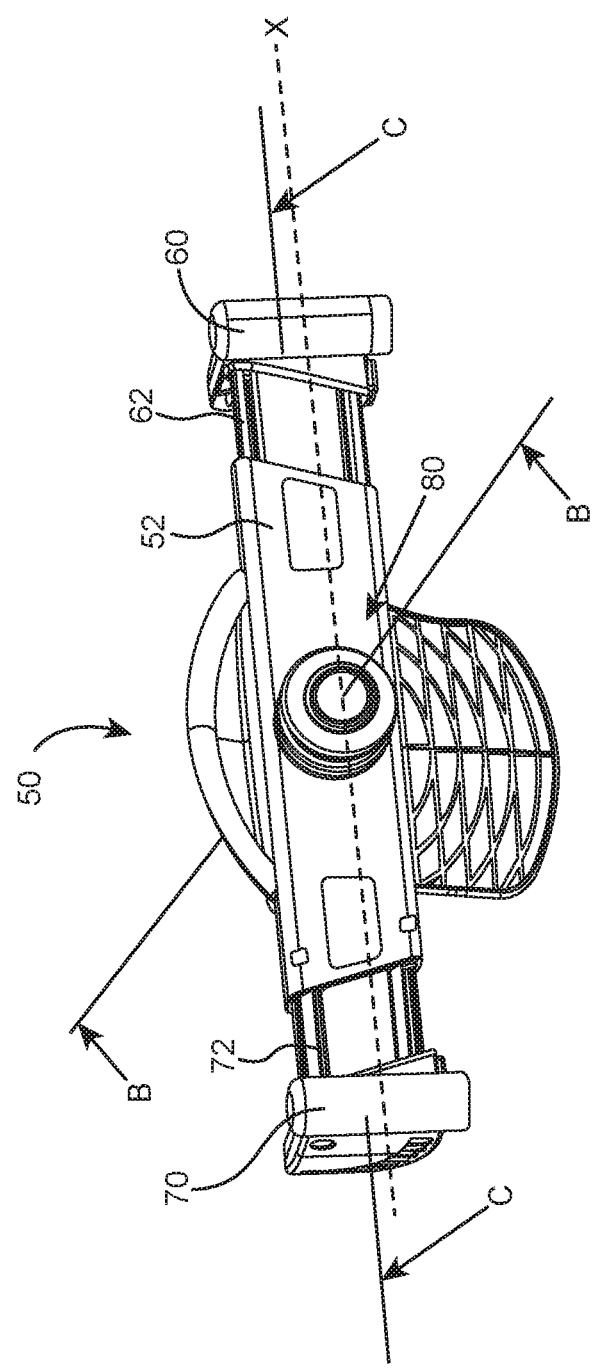
FIG. 3A illustrates a rear perspective view of a head support unit of the head support assembly of FIG. 1A, with its right and left attachment elements at an extended position, and its support body being centralized with respect to the right and left attachment elements.
Figure 3B:
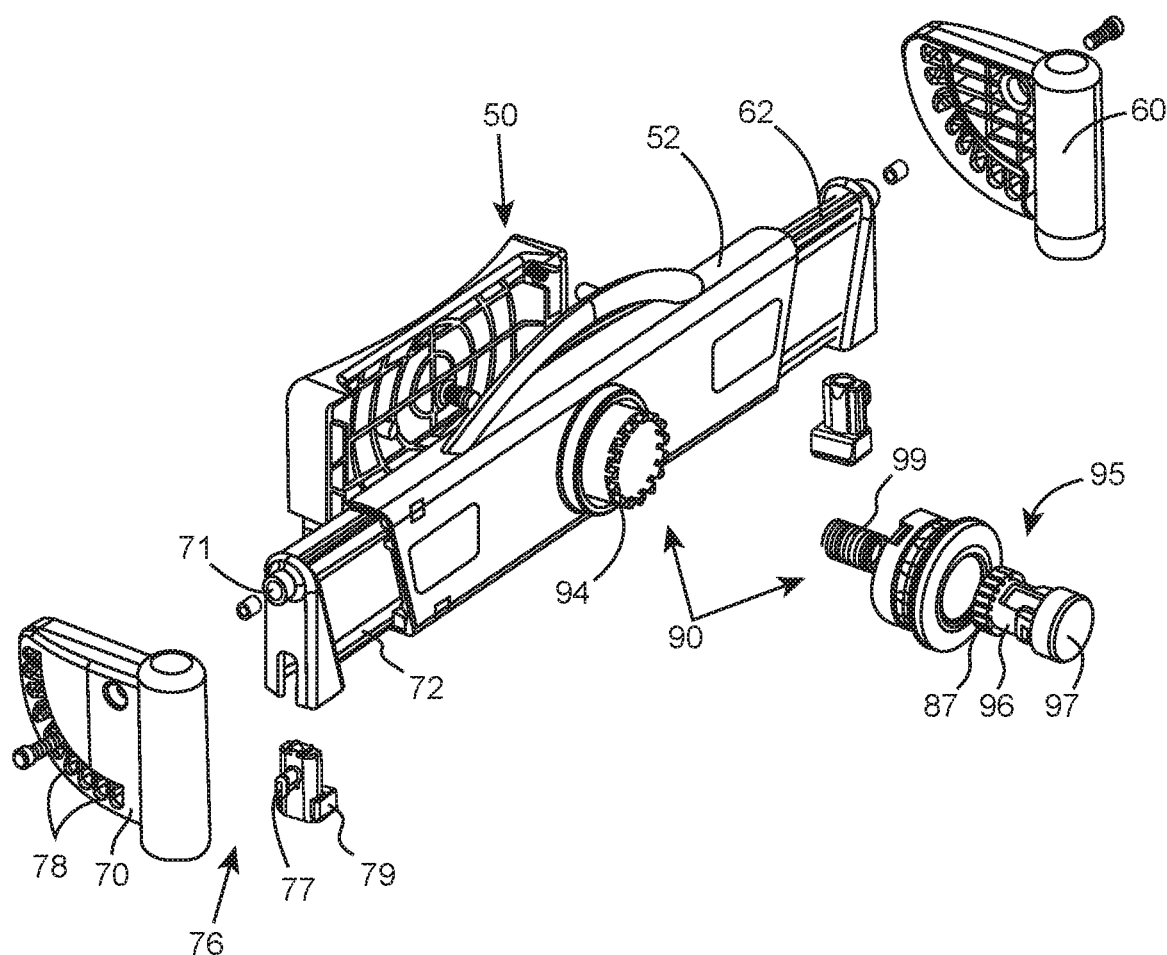
FIG. 3B is an exploded view of the head support unit of FIG. 3A.
Figure 3C:
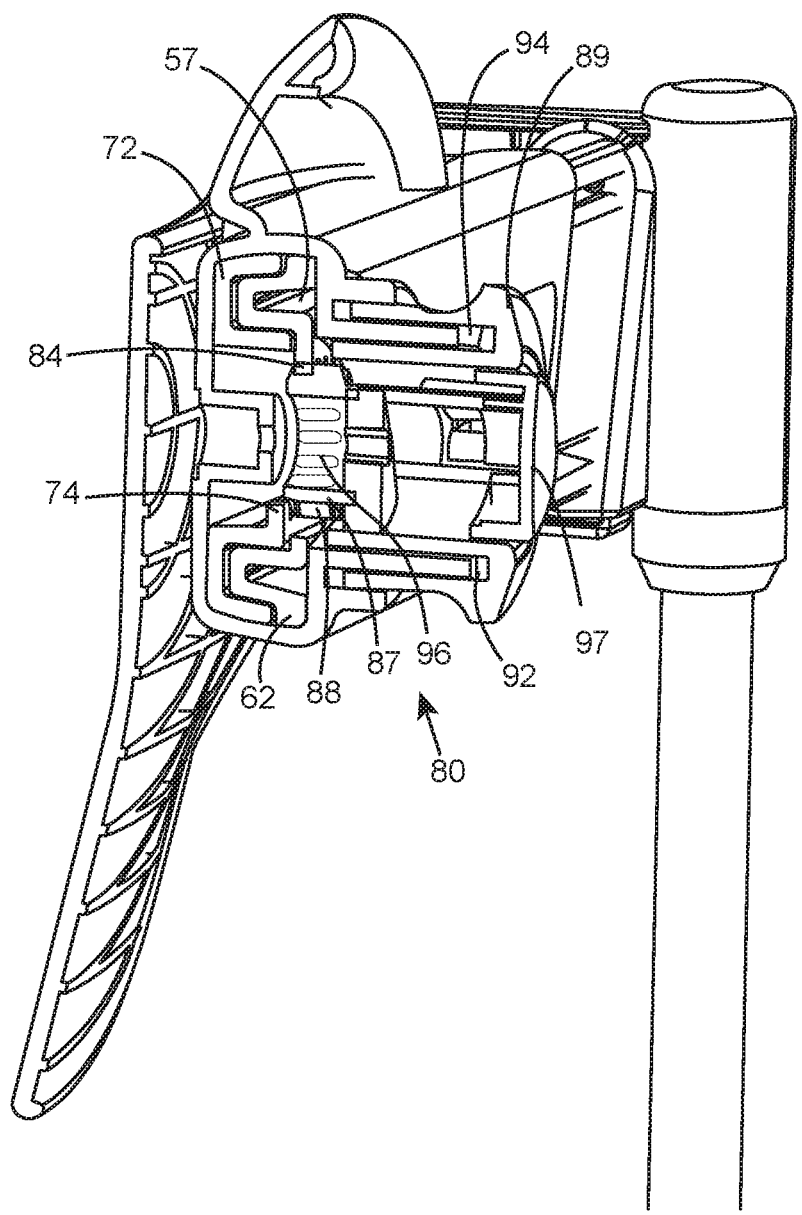
FIG. 3C is a cross-sectional view along line B-B in FIG. 3A.
Figure 3D:
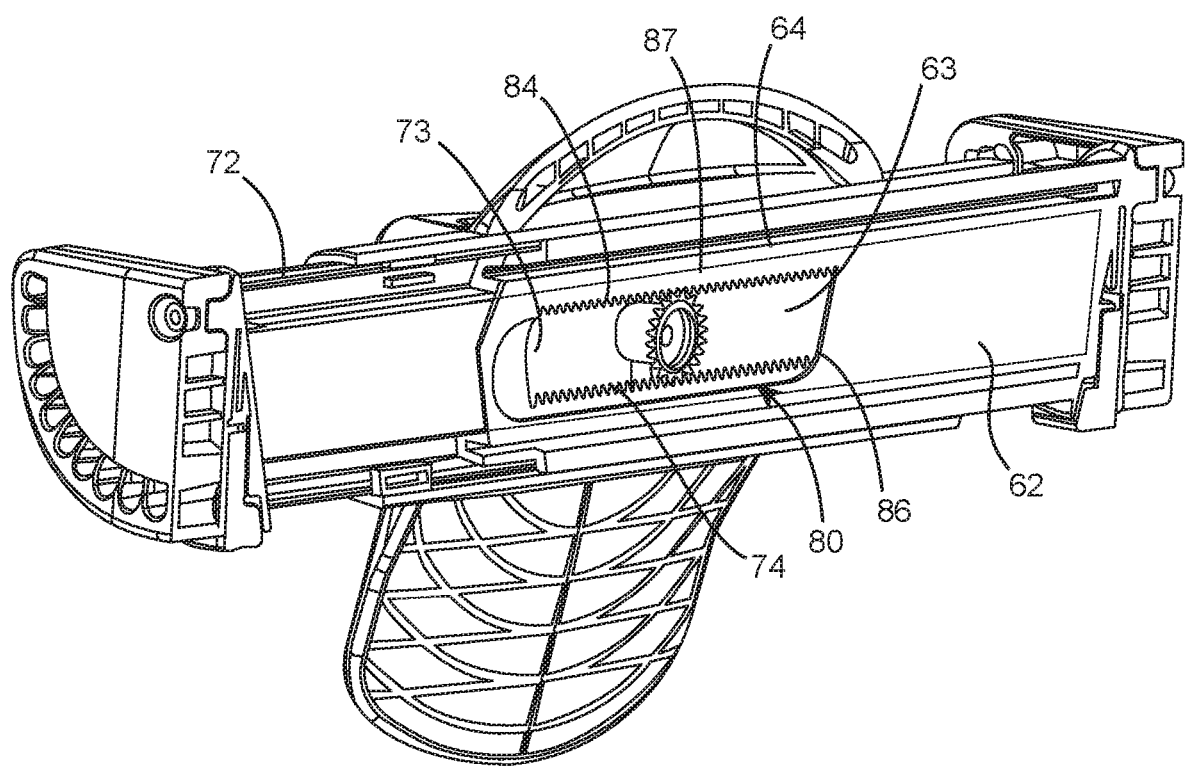
FIG. 3D is a cross-sectional view along line C-C in FIG. 3A.

The main angle fixing mechanism 111 has a spring (not shown) biased actuating member 112 linearly displaceable within the housing of the mounting member 110 along the pitch axis P by an actuating button 113, and a blocking member 114. The post receiving member 120 has a pivot member 121 extending within the actuating member 112. As shown in FIG. 2B, the actuating member 112 has teeth 112' configured to be received within respective recesses (not shown) of the blocking member 114 for blocking pivotable displacement of the actuating member 112 together with the pivot member 121.

Upon displacement of the actuating member 112 by pressing the actuating button 113, the teeth 112' are disengaged from the recesses of the blocking member 114, and the left support post 42 can be titled together with the post receiving member 120 about the pitch axis P. In order to fix a new tilt angle between the left support post 42 and the backrest plane B, the operator has to stop pressing the actuating button 113, which in turn will revert to its normal position, fixing the angular position between the actuating member 112 and the blocking member 114, and resulting in the configuration shown, for example, in FIG. 2C.

The post receiving member 120 has a height fixing mechanism 122 configured for selectively arresting the left support post 42 at different positions thereof along the longitudinal axis L1. The height fixing mechanism 122 constitutes the third displacement mechanism, and is disposed opposite to the main angle fixing mechanism 111.

The height fixing mechanism 122 has a pedal 123 and a friction member 124. The pedal 123 is pivotable about a pedal axis 123' and is biased by a compression spring (not shown) towards a normal position shown in FIG. 2B, at which, a bottom portion of the pedal pushes the friction member 124, which in turn, pushes the left support post 42, and fixes its position within the post receiving member 120.

In order to change the height of the left support post 42 and facilitate sliding displacement thereof, an operator has to press an upper portion of the pedal 123. This will cause the compression spring to displace the friction member 124 outwardly, resulting in disengagement of the friction member 124 from the left support post 42.

The mounting member 110 comprises an embracing portion 130 configured for articulating the left coupler 48 and its left support post 42 to the left frame member 20. The embracing portion 130 is configured with a tension mechanism in the form of bolts and nuts (not shown) configured for controlling the tension applied by the embracing portion 130 on the left frame member 20 for controlling the ability to perform the rotational displacement of the left support post 42 about the roll axis R1.

The embracing portion 130 is in the shape of a bridge shaped and sized to fit over the post received in the coupler. One side of the bridge may be pivotally coupled to the coupler to allow switching between an embracing state, in which the bridge interface with the coupler at its two sides, and an open state, in which the bridge is in pivotal position that allows removal or insertion of a frame member into an embracing area defined between the coupler and the embracing portion.

The ability of the left coupler 48 to rotate about the roll axis R1 constitutes the second displacement mechanism.

Figure 1D:
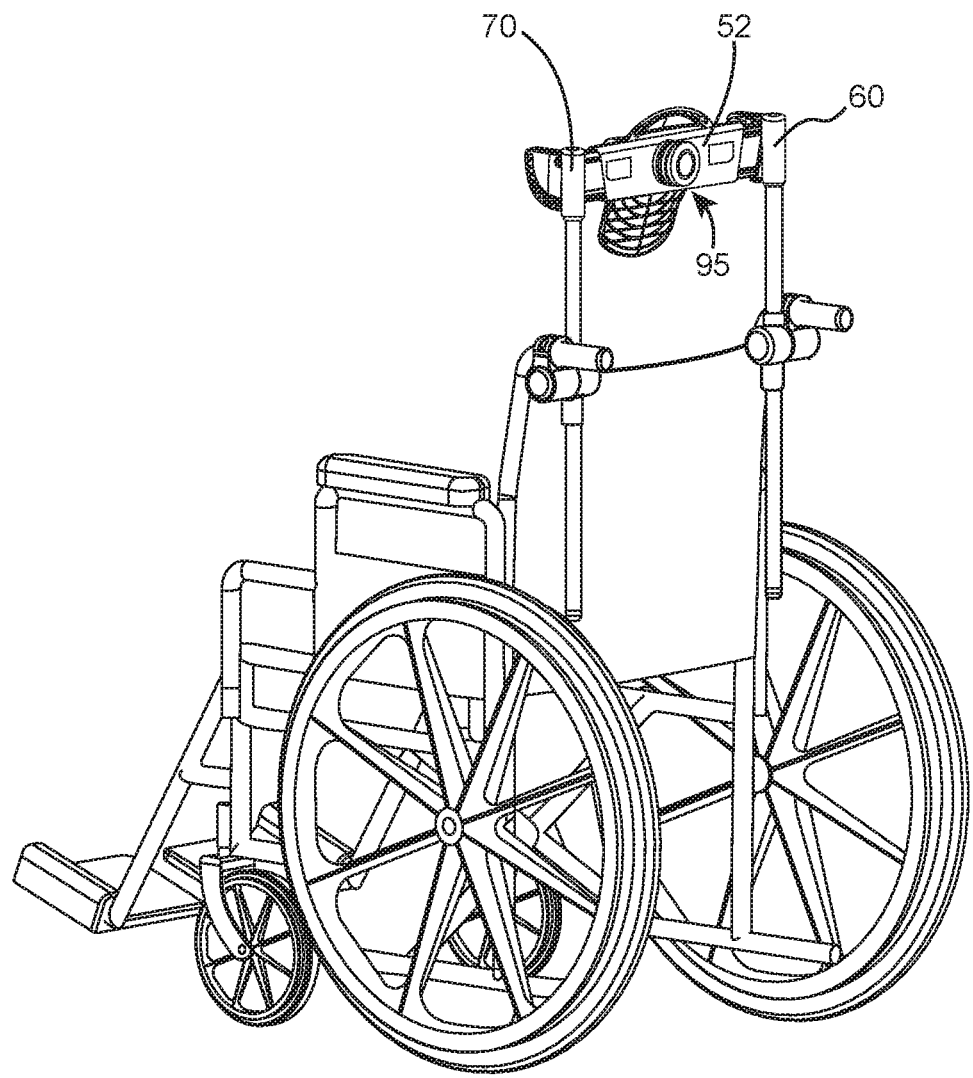
FIG. 1D illustrates the wheelchair of FIG. 1A with a support body of the head support unit being aligned to the right and in a position lower than in FIG. 1A.
Figure 1E:
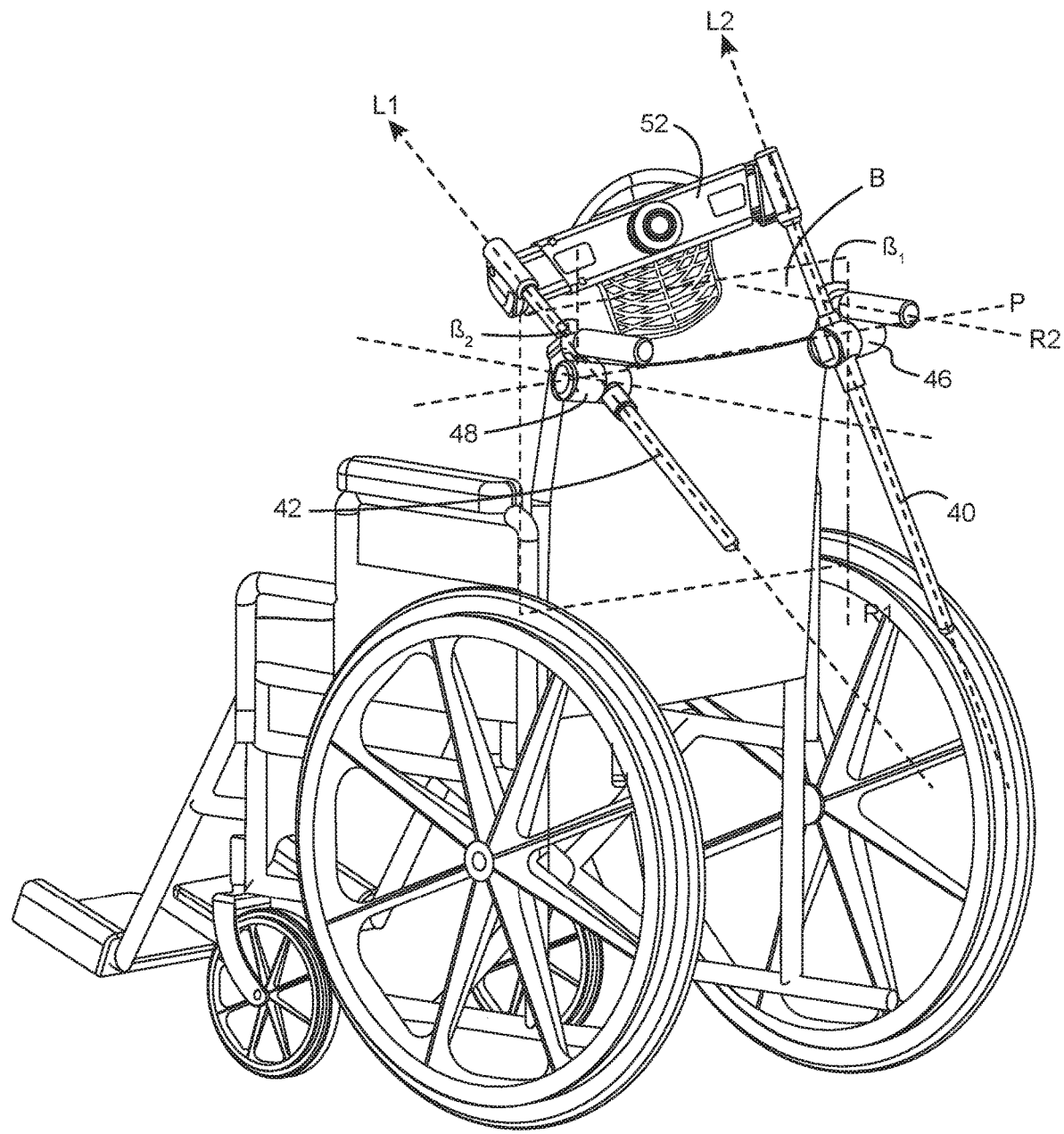
FIG. 1E illustrates the wheelchair of FIG. 1A with a support body of the head support unit being tilted forwardly with a different tilt angle of each support post, aligned to the right, twisted at a different angle with respect to each of its right and left attachment elements, and with the right and left support posts being tilted about their pitch axes with respect to the right and left frame members.
Figure 1F:
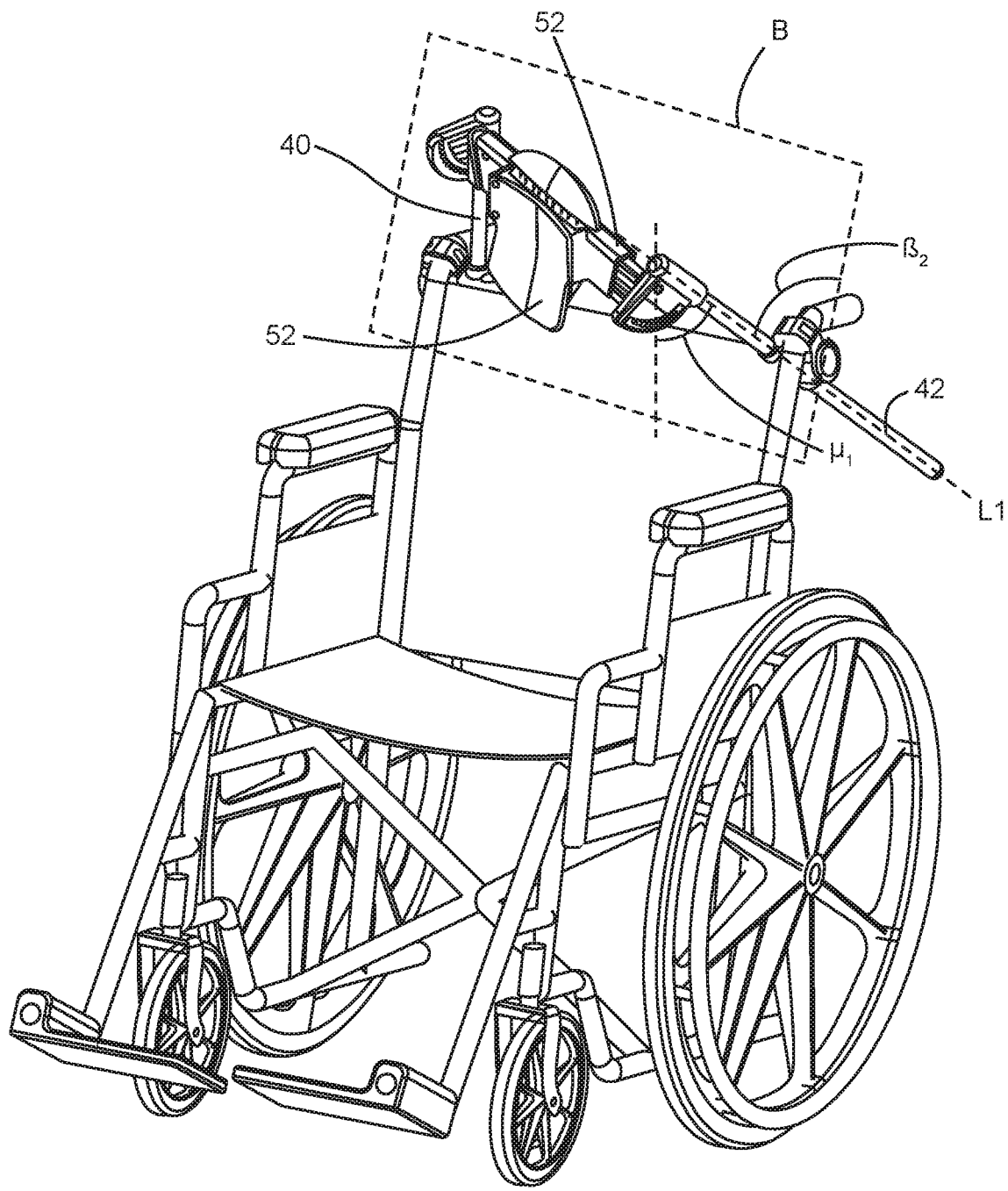
FIG. 1F is a front perspective view of the wheelchair of FIG. 1E.
Figure 1G:
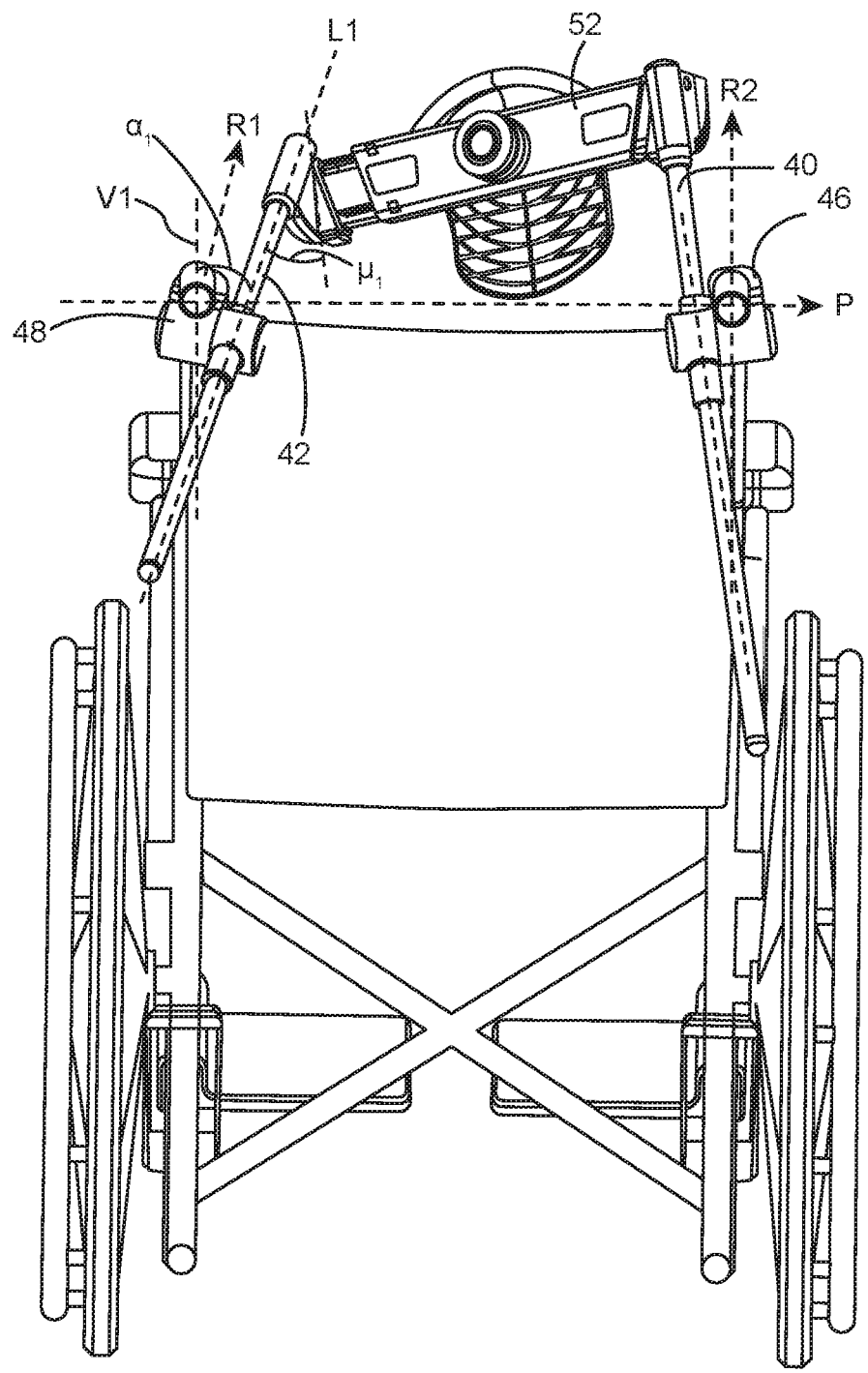
FIG. 1G is a rear view of the wheelchair of FIG. 1E.

The pivoting of the post receiving member 120 with respect to the mounting member 110, and the rotational displacement of the mounting member 110 with respect to the left frame member 20, can be performed simultaneously by rotating the left support post 42 about both of the pitch axis P and the roll axis R1, as shown in FIGS. 1E to 1G.

Reference is now made to FIGS. 3A to 3D and 4A, 4B and 5, in order to describe the structure and the operation of the head support unit 50, and in particular, to describe the manner of operation of the fourth and the fifth displacement mechanisms.

Figure 4A:
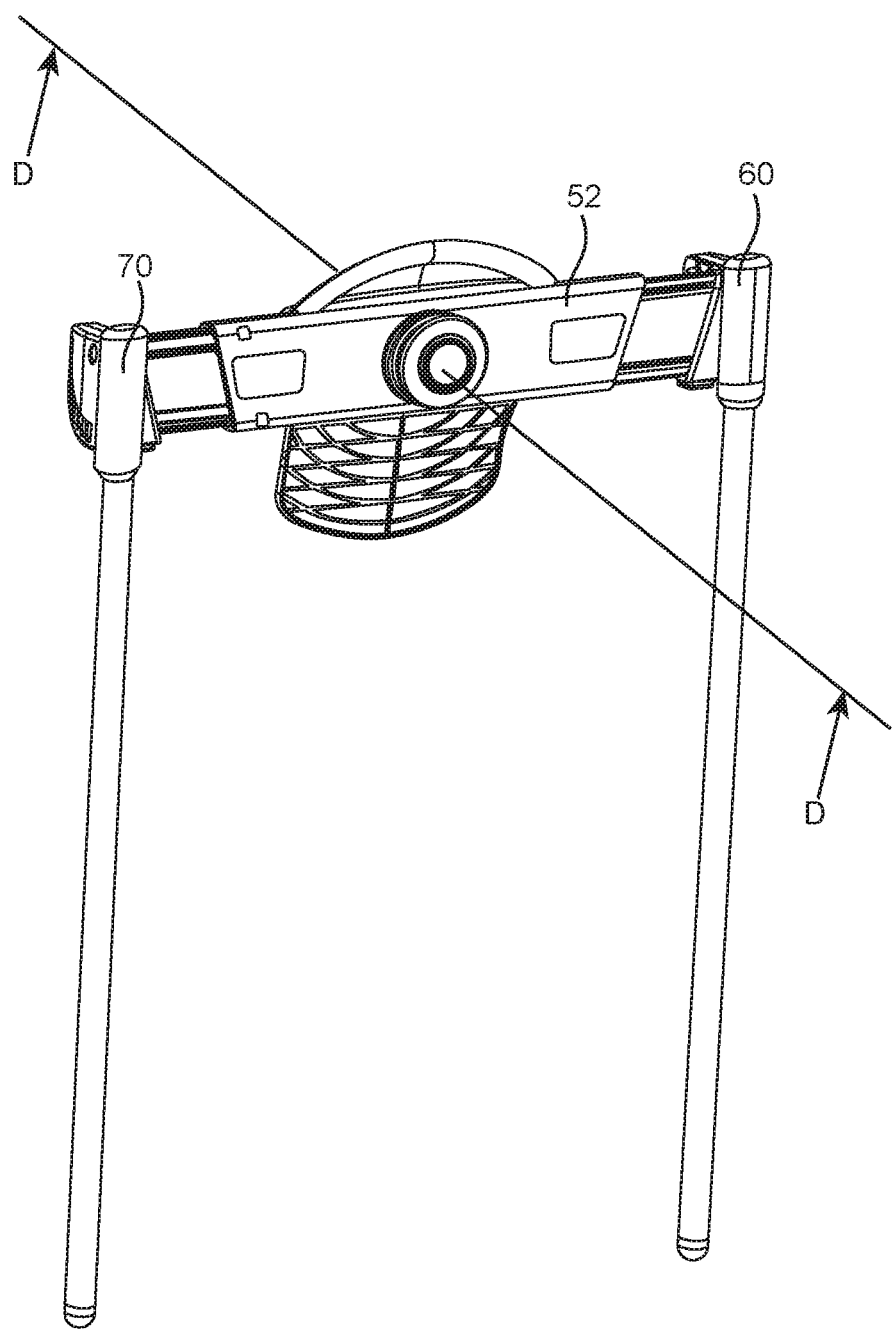
FIG. 4A illustrates the head support unit of FIG. 3A, with its support body aligned to the right.
Figure 4B:
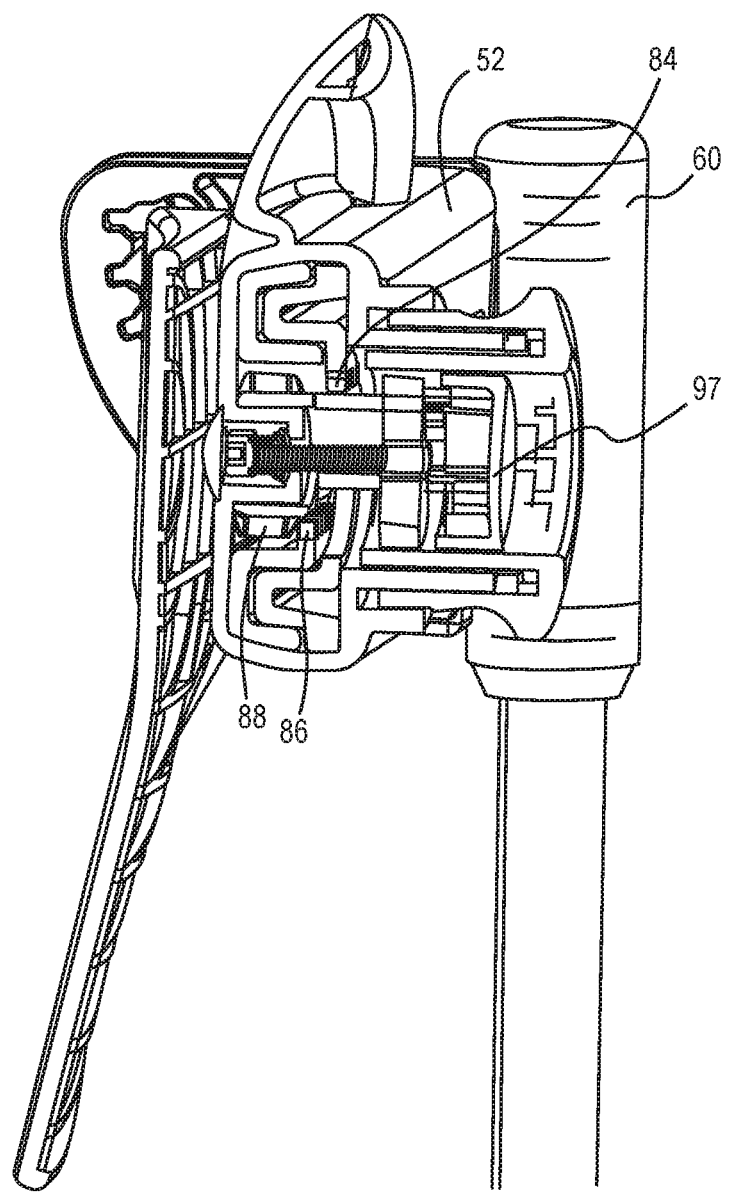
FIG. 4B is a cross-sectional view along line D-D in FIG. 4A.
Figure 5:
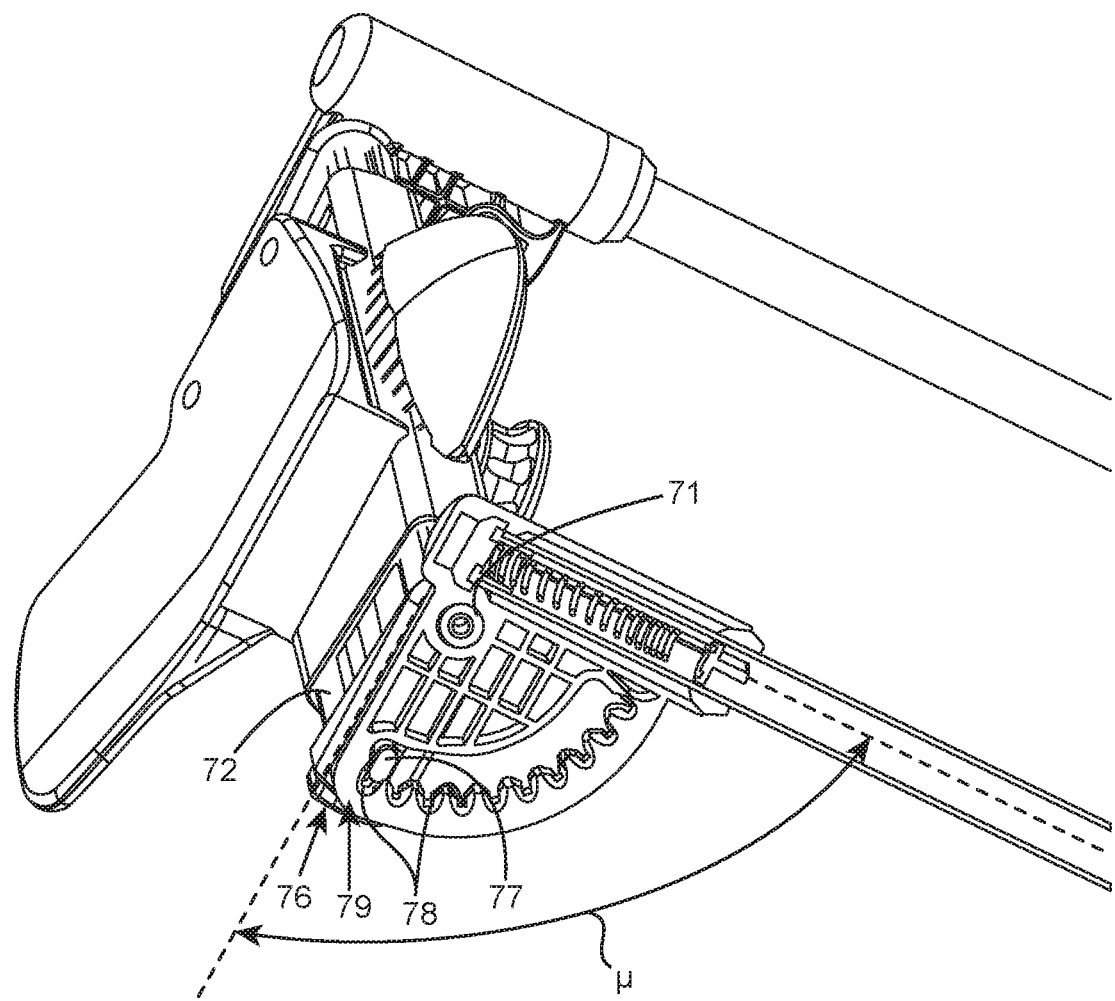
FIG. 5 is a cross-sectional view along line E-E in FIG. 1C.

In FIGS. 3A to 3D, the support body 52 of head support unit 50 is centralized with respect to the wheelchair 14. In FIGS. 4A and 4B, the support body 52 is aligned and displaced to the right side of the wheelchair 14 by the fourth displacement mechanism, as explained below. In FIG. 5, the support body 52 is twisted with respect to the right support post 40 and the left support post 42.

The head support unit 50 comprises an adjustment mechanism 80 configured for selectively adjusting and fixing the position of the right attachment element 60 and the left attachment element 70 with respect to each other between an extended position (shown in FIGS. 5A and 5B) and a retracted position (not shown). The principal of operation of the adjustment mechanism 80 is similar to that of the adjustment mechanism of WO 2019/207580.

In particular, the adjustment of the position of the right attachment element 60 and the left attachment element 70 is performed by simultaneously linearly displacing them towards and away from each other along the longitudinal axis X.

As shown in FIG. 1A, the right support post 40 and the left support post 42 extend vertically upwards in parallel to each other, defining a certain distance therebetween. When the right support post 40 and the left support post 42 are attached to the right and left frame members 18 and 20, and positioned vertically and parallelly to each, the distance therebetween is dictated by the width of the wheelchair 14, and in particular, by the structure and the distance between the right and left frame members 18 and 20 of the wheelchair 14. This distance can change from one seat to another, or be dependent on the locations at which the right and left posts are articulated to the side frame of a particular seat. Thus, the right attachment element 60 and the left attachment element 70 are adjustable with respect to each other in order to detachably attach the head support unit 50 to the right and left support posts 40 and 42 and to fixedly fit the distance therebetween and respectively between right and left frame members 18 and 20. This adjustment enables the right attachment element 60 and the left attachment element 70 to fixedly assume any one intermediate position from a plurality of intermediate positions between the extended position and the retracted position. In the example of FIGS. 1A and 1B, the right attachment element 60 and the left attachment element 70 are fixedly adjusted to an intermediate position which fits the distance between the right support post 40 and the left support post 42, dictated by the distance between the right and left frame members 18 and 20.

Reference is now made particularly to FIGS. 3A to 3D, illustrating the head support unit 50, and different parts thereof.

The adjustment mechanism 80 extends at least partially within the support body 52 and is configured to simultaneously displace the right attachment element 60 and the left attachment element 70 with respect to each other and with respect to the support body 52. The simultaneous adjustment of the position of the right attachment element 60 and the left attachment element 70 is such that upon operation of the adjustment mechanism 80, the right attachment element 60 and the left attachment element 70 are displaced at the same distance. Moreover, in the example of FIGS. 3A to 3D, the support body 52 is symmetrical with respect to the right attachment element 60 and the left attachment element 70, that are equally spaced from the center of the support body 52 at their various positions between the extended position and the retracted position. The adjustment mechanism 80 is operable by an operator to increase or decrease the distance between the right attachment element 60 to the left attachment element 70, so that a single operation of the user adjusts and displaces both of the right attachment element 60 and the left attachment element 70, either towards the extended position and/or towards the retracted position.

As sown in FIG. 2, the right attachment element 60 and the left attachment element 70 are connected at opposite sides of the support body 52 via a right extending element 62 and a left extending element 72, respectively, both slidable within the tunnel 57 and constituting part of the adjustment mechanism 80. The adjustment mechanism 80 is configured to displace and fix the right attachment element 60 and the left attachment element 70 at a plurality of positions by displacing and fixing the right extending element 62 and the left extending element 72 with respect to the support body 52.

The right extending element 62 comprises a right elongate opening 63 formed therein with a right upper rim 64 having a right drive element in the form of teeth extending therefrom and constituting an upper rack 84. The left extending element 72 comprises a left elongate opening 73 formed therein with a left lower rim 74 having a left drive element in the form of teeth extending therefrom and constituting a lower rack 86. The adjustment mechanism 80 comprises the upper rack 84, the lower rack 86, and a driving gear 87 comprising a driving portion in the form of a pinion 88 engaged with both of the upper rack 84 and the lower rack 86 and extending through the right elongate opening 63 and the left elongate opening 73.

The driving gear 87 is provided with a rotatable handle 89 configured to be gripped by an operator and rotated towards a clockwise direction for adjustment of the right and left attachment elements 60 and 70 from the retracted position towards the extended position, and rotated towards a counterclockwise direction for adjustment of the right and left attachment elements 60 and 70 from the extended position towards the retracted position.

As mentioned above, the adjustment mechanism 80 is further configured for selectively fixing the position of the right attachment element 60 and the left attachment element 70 with respect to each other. The head support unit 50 thus comprises a unit unit fixing mechanism 90 operable with the adjustment mechanism 80 and configured to normally fix the right attachment element 60 and the left attachment element 70 at any one intermediate position from a plurality of intermediate positions between the extended position and the retracted position, and preventing the displacement thereof the respect to the support body 52.

The unit fixing mechanism 90 has a latch portion 92 (shown in FIG. 3C) in the form of teeth formed in the handle 89, selectively engageable with a locking portion 94 of the support body 52 (shown in FIGS. 2, 3C, 3D and 4C) formed as depressions. The teeth of the locking portion 94 are designed in a complementary manner to the depressions of the latch portion 92, such that when the locking portion 94 is displaced into engagement with the latch portion 92, the locking portion 94 is flush with the latch portion 92 and is prevented from movement. This state of the unit fixing mechanism 90 is shown in all the figures, and is considered as a locked state of the unit fixing mechanism 90. The number of teeth and depressions and the spacing therebetween determines the number of the discrete positions (e.g., intermediate positions) and the difference between the positions.

Thus, the unit fixing mechanism 90 is configurable between:
 a locked state (shown in all the figures), at which the latch portion 92 is engage with the locking portion 94, so as to prevent the driving gear 87 from rotation, and fixing the respect position of the right and left attachment elements 60 and 70; and
 an unlocked state (not shown), at which the latch portion 92 is disengaged from the locking portion 94, so as to enable rotation of the driving gear 87.

The handle 89 is spring biased towards the normally locked state by a tension spring (not shown), and in order to pull the handle 89 and cause the fixing mechanism to assume its unlocked state, the operator has to apply a pulling force against the force of the tension spring.

The unit fixing mechanism 90 is configurable between the locked state and the unlocked state by being slidably displacing the driving gear 87 towards and away from the support body 52 perpendicularly to the longitudinal axis X, by pulling and pushing the handle 89 by the operator, towards and away from the support body 52.

For example, in order to displace the right attachment element 60 and the left attachment element 70 from their retracted position, at which the unit fixing mechanism 90 is at the locked state, the handle 89 has first to be pulled by the user away from the support body 52. This causes the unit fixing mechanism 90 to assume its unlocked state. Only at this unlocked state, the latch portion 92 is disengaged from the locking portion 94, and the operator can rotate the handle 89 in the clockwise direction, so as to rotate the driving gear 87. During the rotation of the handle 89, the distance between the right attachment element 60 and the left attachment element 70 is decreased, and they pass through a plurality of intermediate positions. At any intermediate position, at which the wanted distance is obtained, the handle 89 is pushed towards the support body 52, causing the unit fixing mechanism 90 to assume its locked state.

The head support unit 50 comprises a neutralizing mechanism 95 operative with the adjustment mechanism 80 for selectively allowing free displacement of the support body 52 with respect to the right extending element 62 and the left extending element 72. The neutralizing mechanism 95 thus enables neutralizing the adjustment mechanism 80, and this provides an additional degree of freedom for properly locating the support body 52 with respect to the head of the seated user.

The neutralizing mechanism 95 is constituted by a neutralizing member 96 having the driving gear 87 at its distal end, and a neutralizing button 97 at its proximal end. The neutralizing member 96 is coaxially positioned within the handle 89 and is spring biased by a compression spring 99.

The neutralizing mechanism 95 is switchable between an operative state at which the adjustment mechanism 80 is operative for displacing both of the right extending element 62 and the left extending element 72, and an inoperative state at which the support body 52 is freely displaceable with respect both of the right extending element 62 and the left extending element 72 and irrespectively of the adjustment mechanism 80. At the operative state of the neutralizing mechanism 95, shown in FIGS. 3A, 3C and 3D, the unit fixing mechanism 90 has to be used as described above for displacing the right extending element 62 and the left extending element 72.

The neutralizing member 96 is configured to be axially displaced with the driving gear 87 along a rotation axis thereof between an engaged position (shown in FIGS. 3C and 3D) corresponding to the operative state and at which the pinion 88 is engaged with the upper rack 84 and the lower rack 86, and a disengaged position (shown in FIGS. 1D, 4A and 4B) corresponding to the inoperative state and at which the pinion 88 is disengaged from both the upper rack 84 and the lower rack 86.

The displacement of the neutralizing member 96 from the engaged position to the disengaged position is performed by an operator pressing and holding the neutralizing button 97. When the operator stops pressing the neutralizing button 97, the neutralizing member 96 automatically tends to revert to its normally engaged position. As a result of that, the adjustment mechanism 80 can be used for simultaneously displacing the right and left attachment elements 62 and 72, as described above.

In summary, when the right attachment element 60 and the left attachment element 70 are articulated with the right support post 40 and the left support post 42, respectively, at the inoperative state of the neutralizing mechanism 95, the support body 52 can be freely aligned and displaced towards one of the right extending element 62 and the left extending element 72 and away from another one of the right extending element 62 and the left extending element 72.

Reference is now made to FIGS. 1D, 4A and 4B, in which the support body 52 is maximally displaced to the right by using the neutralizing mechanism 95 (constituting the fourth displacement mechanism), and is proximal to the right attachment element 60, while the neutralizing button 97 is pressed by the operator. As seen in FIG. 4B, the neutralizing member 96 is axially displaced with the driving gear 87 along the rotation axis thereof to a disengaged position corresponding to the inoperative state and at which the pinion 88 is disengaged from both the upper rack 84 and the lower rack 86. As this position, the head support assembly can be used for mounting thereto a head of a seated person with his head tilted to the right.

Reference is now made to 1C and 5, illustrating the fifth displacement mechanism, capable of facilitating the support body 52 to be twistable with respect to the right attachment element 60 and the left attachment element 70.

This mechanism is provided by right extending element 62 being pivotally connected to the right attachment element 60 by a right pivot member (not shown) and by the left attachment element 70 being pivotally connected to the left extending element 72 by a left pivot member 71 for facilitating the twist of the support body 52 with respect to the right attachment element 60 and the left attachment element 70.

The head support unit 50 is also provided with a right auxiliary angle fixing mechanism 66 and a left auxiliary angle fixing mechanism 76. The left auxiliary angle fixing mechanism 76 (shown clearly in FIG. 5), is configured, upon the twist, for selectively fixing a twist angle $\mu$ between the support body 52 and the longitudinal axis L1. The left auxiliary angle fixing mechanism 76 comprise a spring biased pin 77 configured to be selectively received within one of a plurality of recesses 78. The pin 77 is connected to a push button 79 configured for displacing the pin 77 up and down for selectively fixing the twist angle $\mu$.

In order to summarize the above described manner of operation of the five displacement mechanisms, reference is now made to FIGS. 1E to 1G, in which the support member 52 has been brought into a complex spatial orientation by using all these mechanisms.

The first displacement mechanism has been used for tilting the right support post 40 about the pitch axis P to a tilt angle $\beta1$ between the longitudinal axis L2 and the backrest plane B, and for tilting the left support post 42 about the pitch axis P to a tilt angle $\beta2$ between the longitudinal axis L1 and the backrest plane B. This tilt of the right and left support posts 40 and 42 has been obtained by the pivotal rotation of the post receiving members of the right coupler 46 and the left coupler 48, upon using their respective main angle fixing mechanisms.

The second displacement mechanism has been used tilting the support posts 40 and 42 about their respective roll axes R1 and R2. As shown in FIG. 1G, upon performing this tilt, a roll angle $\alpha1$ is formed between the longitudinal axis L1 and a vertical axis V1.

The third displacement mechanism has been used for properly positioning the height of the support posts 40 and 42 along their respective axes L1 and L2, by using the height fixing mechanisms of the right coupler 46 and the left coupler 48, respectively.

The fourth displacement mechanism has been used for displacing the support body 52 as close as possible to the right support post 40, by using the neutralizing mechanism 95 of the head support unit 50.

The fifth displacement mechanism has been used for twisting the support body 52 with respect to the left attachment element 70 and its longitudinal axis L1, and fixing the angle therebetween at a twist angle $\mu1$ (shown in FIGS. 1F and 1G).

Figure 6A:
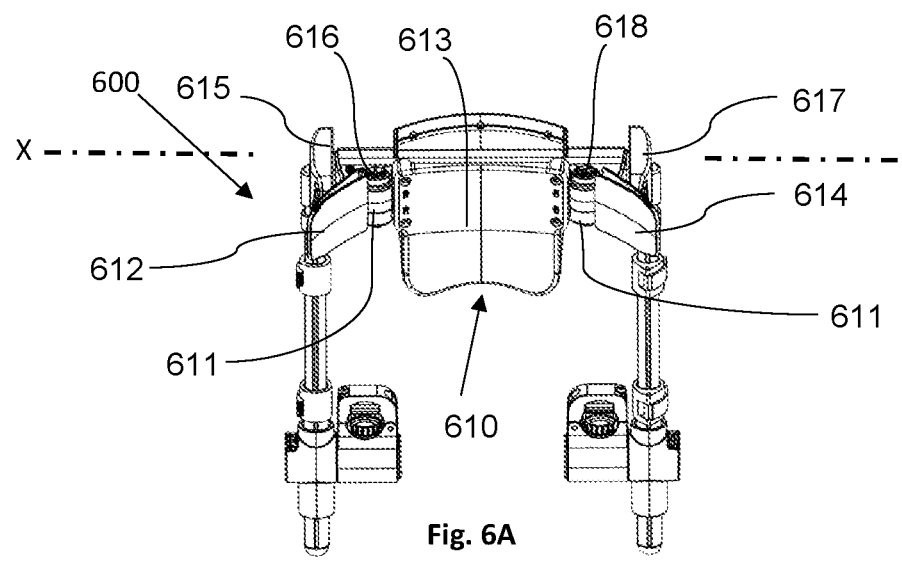
FIGS. 6A-6E are schematic illustrations of a non-limiting embodiment of the head support assembly, showing different views and/or different folding states of the side portions of the head support unit.
Figure 6B:
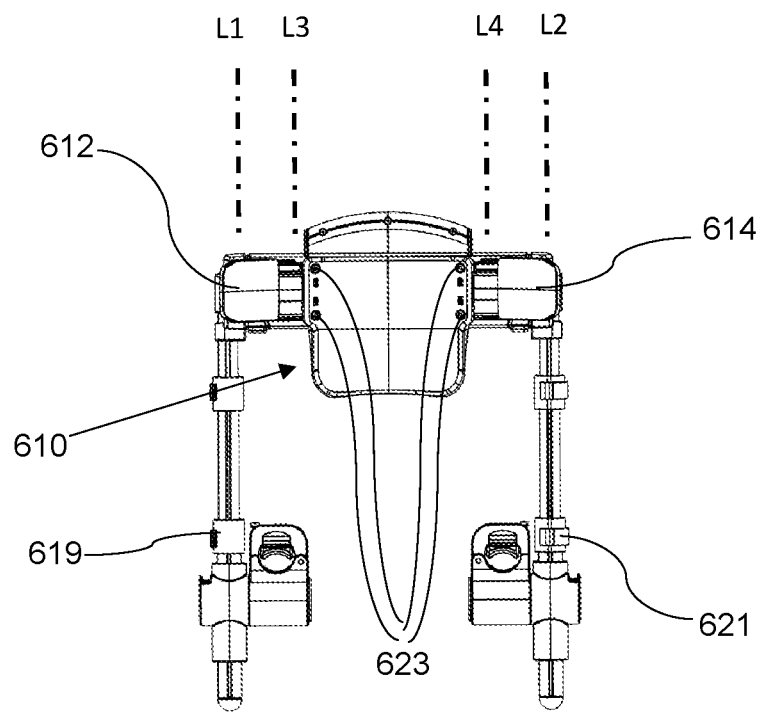
Figure 6C:
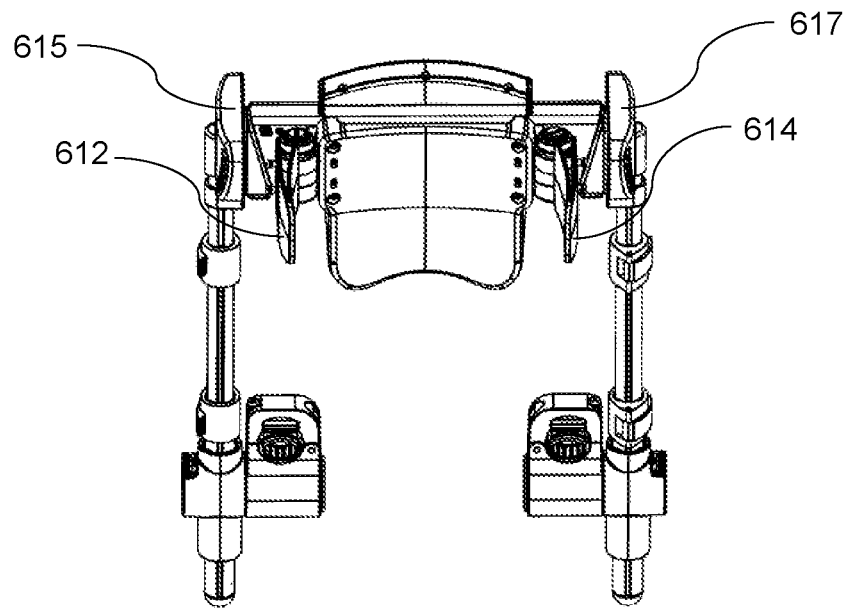
Figure 6D:
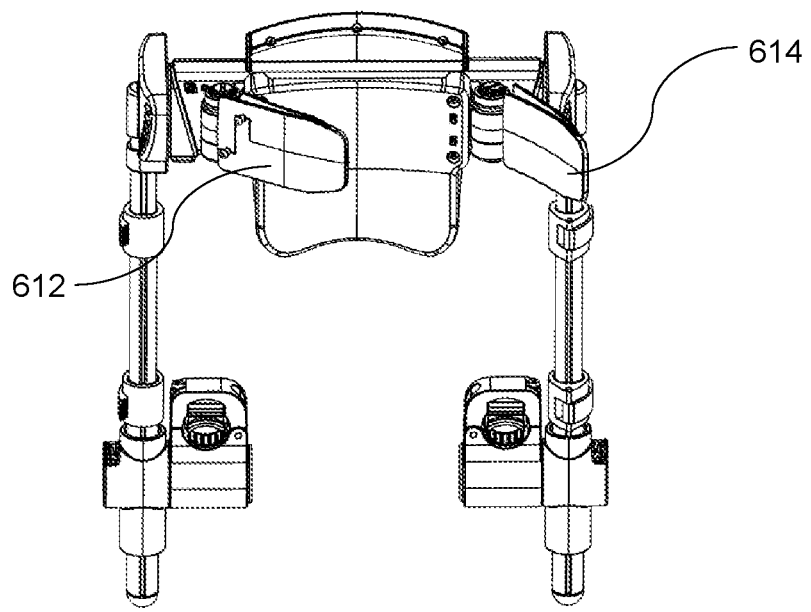
Figure 6E:
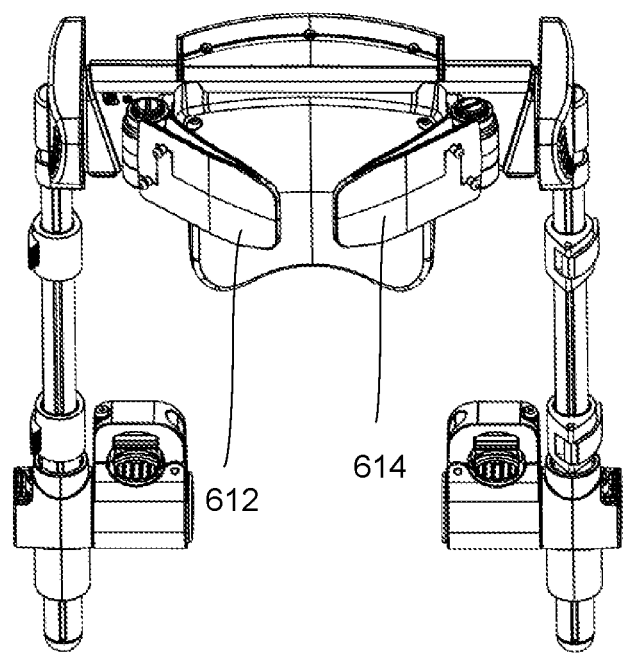

Reference is now being made to FIGS. 6A-6E, which are schematic illustrations of a non-limiting embodiment of the head support assembly of the present disclosure. This embodiment differs from that described in FIGS. 1-5 by that the head support unit 610 of the head support assembly 600 includes two head support unit side portions 612 and 614 laterally extending from hinges 611 coupling the head support unit side portions to a central portion 613 of the head support unit 610. The head support unit side portions 612 and 614 are foldable about two parallel axes, L3 and L4, respectively. The axes L3 and L4 are parallel to the longitudinal axes L1 and L2, when the posts are in natural position. The head support unit side portions 612 and 614 are each foldable along a range of folding positions between a most opened position, as can be seen in FIGS. 6A and 6B, in which each side portion is at the extreme folding position towards an opposite direction than that of the other side portion, and a most closed position, as can be seen in FIG. 6E, in which each side portion is at the extreme folding position towards the other side portion. In between the most opened position and the most closed position, each of the head support unit side portions can be adjusted to a plurality of folding states, independent to the folding state of the other head support unit side portion. Each of the head support unit side portions 612 and 614 is associated with a respective locking mechanism 616 and 618, respectively. Each locking mechanism is configured to switch between two states. The first state allows (i) locking the respective head support unit side portion at a certain folding position, independent to the folding position of the other head support unit side portion, and the second state allows (ii) free folding movement of the respective head support unit side portion, independent to the other folding state of the head support unit side portion. FIG. 6C shows the head support unit side portions in a parallel, neutral folding position. FIG. 6D shows asymmetric folding position of the two head support unit side portions, namely one of the head support unit side portions is at a certain folding position and the second head support unit side portion is at a different folding position, i.e. at a different folding angle, with respect to the neutral position.

Furthermore, in this embodiment, the head support assembly 600 includes two attachment elements 615 and 617, that are rotatable about a horizontal axis X±90° from the natural position that is shown in FIGS. 6A-6E. The rotation of the attachment elements affects the angle of the plane defined by the central portion 613 with respect to the ground.

The posts 619 and 621 are telescopic, allowing a more efficient use of the head support assembly and storing it more compactly.

The head support unit 610 is coupled to the head support assembly 600 via four coupling members 623 in the form of screws. By that coupling configuration, the head support unit that is coupled to the head support assembly can be replaced. Thus, the head support unit can be personally designed for a specific individual and to be coupled to any head support assembly through the coupling members. Furthermore, one head support assembly can be coupled to many head support units and may serve many different individuals over a period of time.

Figure 7A:
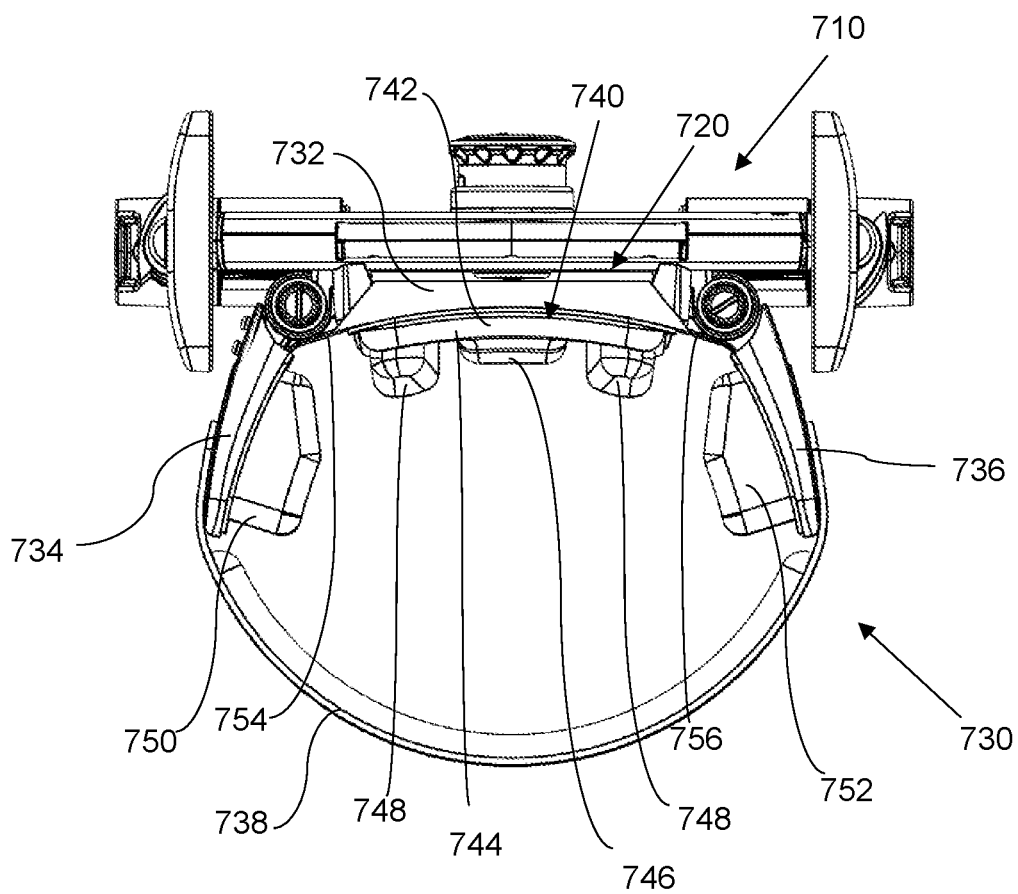
FIG. 7A-7B are schematic illustrations of a non-limiting embodiment of the head support assembly, in which the head support unit is fitted with a headrest, cushioned, member.
Figure 7B:
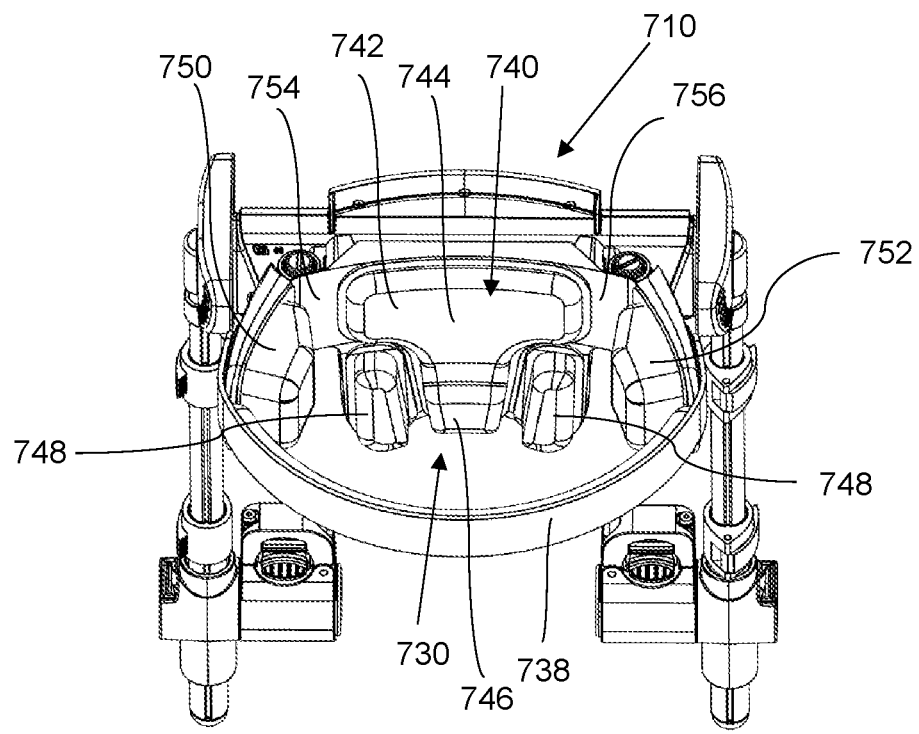

The head support unit is configured to be fitted with a headrest member, which is typically a soft arrangement of cushions on which the subject's head is rest on. The head support unit fitted with the headrest member is shown in FIGS. 7A-7B. The headrest member 730 includes a tab 732 that is received in a slit 720 formed in a central portion 722 of the head support unit 710. Corresponding side portions 734 and 736 of the headrest member 730 are configured to fit over the head support unit side portions 712 and 714, respectively. The side portions 734 and 736 of the headrest member 730 and head support unit side portions are foldable together, namely the folding position of the one results in similar folding position of the other. The headrest member 730 further comprises a restraining member 738 attached to the side portions 734 and 736 and configured for rotation at least between an upward position and a downward position, wherein upon being in said downward position the restraining member 738 is configured to support a subject's forehead of a head of a subject that is supported by the head supporting unit 710. The displacement of the restraining member 738 between its upward position and its downward position is configured to cause the headrest member to assume its first and second states, respectively.

The headrest member 730 is made of soft, cushioning materials that are configured to provide soft support for a head of a subject. The headrest member 730 is formed with a plurality of cushions. The central portion 740 of the headrest member 730 is formed with a central cushion 742 protruding from the central portion 740. The central cushion 742 includes a first portion 744 protruding to a first elevation and a second portion 746 protruding to a second elevation greater than the first elevation, as can be best seen in FIG. 7A. The contour of the central cushion 742 is designed to conform with the occipital bone of the subject, therefore the second portion 746 is configured to meet a lower portion of the head of the subject. The central portion 740 further includes a pair of supporting cushions 748, each is disposed at a different side of the second portion 746 of the central cushion 742. Each of the supporting cushions 748 protrudes to a third elevation, greater than the second portion 746.

Each of the side portions 734 and 736 of the headrest member 730 is formed with a respective side portion cushion 750 and 752, respectively, that are separated from the central portion 742 and the central cushion 744. The separating portions 754 and 756 between the central cushion 744 and the side cushions 750 and 752 are relatively thin to allow folding of the side cushions with respect to the central cushion together with the head support unit side portions.

The invention claimed is:

1. A head support assembly attachable to a seat comprising a right frame member and a left frame member, the head support assembly comprising:

a right support post and a left support post;

a right coupler and a left coupler, articulatable respectively to the right frame member and to the left frame member, and configured for independently arresting the right support post and the left support post, respectively, in a manner facilitating tilting the support post at least partially about a pitch axis extending between the right coupler and the left coupler; and a head support unit articulable to a right top portion of the right support post and to a left top portion of the left support post.

2. The head support assembly of claim 1, wherein said right coupler and left coupler, are articulatable respectively to the right frame member and to the left frame member, and configured for independently arresting the right support post and the left support post, respectively, in a manner also facilitating selectively sliding displacement of the support post along a longitudinal axis thereof.

3. The head support assembly of claim 1, wherein each one of the right coupler and the left coupler comprises a mounting member articulable to the respective right and left frame member, and a post receiving member configured for arresting the respective right and left support post and being pivotable with respect to the mounting member for facilitating the tilting of the support post about the pitch axis;

wherein said mounting member is articulable to the respective right and left frame member in a manner facilitating rotational displacement of the respective support post about a roll axis of the respective frame member.

4. The head support assembly of claim 3, wherein said mounting member comprises an embracing portion configured for performing said articulation by embracing its respective right and left frame member, and wherein the embracing portion comprises a tension mechanism configured for controlling the tension applied by the embracing portion on the respective tight and left frame member for controlling the ability to perform the rotational displacement of the respective support post with respect to the respective right and left frame member.

5. The head support assembly of claim 3, when dependent on claim 2, wherein the pivoting of the post receiving member with respect to the mounting member, and the rotational displacement of the mounting member with respect to the respective right and left frame member, are configured to be performed simultaneously for facilitating displacement of the respective support post about both of said pitch axis and said roll axis.

6. The head support assembly of claim 3, wherein at least one of the right coupler and the left coupler comprises a main angle fixing mechanism configured, upon said tilting, for selectively arresting the angular position of the mounting member with respect to the post receiving member, thereby fixing a tilt angle between the respective support post and a backrest plane defined by a backrest of the seat;

wherein said post receiving member comprises a height fixing mechanism configured for selectively arresting the respective support post at different positions thereof with respect to the post receiving member along said longitudinal axis.

7. The head support assembly of claim 1, wherein said head support unit comprises a right attachment element articulable to the right top portion, a left attachment element articulable to the left top portion, and a support body disposed between the right attachment element and the left attachment element; and wherein the support body is twistable with respect to at least one of said right attachment element and said left attachment element.

8. The head support assembly of claim 7, wherein the right attachment element and the left attachment element are disposed at opposite sides of the support body via a right extending element and a left extending element, respectively; and wherein at least one of said right attachment element and said left attachment element is pivotally connected to its respective extending element for facilitating said twist of the support body with respect to the respective one of the right attachment element and left attachment element.

9. The head support assembly of claim 8, wherein said head support unit comprises an adjustment mechanism configured for selectively adjusting the position of the right attachment element and the left attachment element with respect to each other, by displacing said right extending element and said left extending element, respectively, between a retracted position and an extended position; and a neutralizing mechanism operative with said adjustment mechanism for selectively allowing free displacement of the support body with respect to at least one of said right extending element and said left extending element.

10. The head support assembly of claim 9, wherein said neutralizing mechanism is switchable between an operative state at which said adjustment mechanism is operative for displacing both of said right extending element and said left extending element, and a fully inoperative state at which the support body is freely displaceable with respect both of said right extending element and said left extending element and irrespectively of said adjustment mechanism.

11. The head support assembly of claim 10, wherein the adjustment mechanism comprises: right and left drive elements, oppositely disposed to one another along a length of the right extending element and the left side extending element, respectively; and a driving gear comprising a driving portion configured, at said operative state of the neutralizing mechanism, to be engaged with the right and left drive elements and configured, upon rotation of the driving gear, for displacing said right extending element and said left extending element, respectively.

12. The head support assembly of claim 11, wherein said neutralizing mechanism comprises a neutralizing member configured for axially displacing said driving portion along a rotation axis thereof between an engaged position corresponding to said operative state and at which said driving portion is engaged with the right and left drive elements, and a disengaged position corresponding to said inoperative state and at which said driving portion is disengaged from both of said right extending element and said left extending element.

13. The head support assembly of claim 9, wherein said head support unit further comprises a unit fixing mechanism operative with said adjustment mechanism for selectively fixing the position of the right extending element and said left extending element and preventing the displacement thereof with respect to the support body;
wherein the driving gear further comprises a latch portion selectively engageable with a locking portion of the support body, said latch portion and said locking portion constitute at least a part of the unit fixing mechanism; and wherein the driving gear is configurable between: a locked state, at which the latch portion is engaged with the locking portion, so as to prevent the driving gear from rotation; and an unlocked state, at which the latch portion is disengaged from the locking portion, so as to enable rotation of the driving gear and respective adjustment of the position of the right attachment element and the left attachment element with respect to each other.

14. The head support assembly of claim 13, wherein the head support unit is configured to receive a headrest member that comprises a central portion and two side portions, wherein the two side portions are foldable with respect to the central portion so as to allow the headrest member to assume a first state in which the side portions are spaced from each other at a first extent and a second state in which the side portions are spaced from each other to a second extent which is smaller than said first extent;
wherein the headrest member further comprises a restraining member attached to said side portions and configured for rotation at least between an upward position and a downward position, wherein upon being in said downward position the restraining member is configured to support a subject's forehead of a head of a subject that is supported by the head supporting unit;
wherein the head support unit comprises corresponding head support unit side portions, the side portions of the headrest member are configured to be attached to or fit over said head support unit side portions such that the side portions of the headrest member and the head support unit side portions fold together;
wherein the head support unit comprises a locking mechanism for allowing (i) locking each of the head support unit side portions, independently, at a desired folding position or (ii) free movement of the side portions;
wherein each side portion of the head support unit comprises its own respective locking mechanism.

15. The head support assembly of claim 14, wherein said central portion comprises a central cushion and each side portion comprises a respective side cushion, wherein the central cushion protrudes from a central surface defined by the central portion and the side cushions protrude from side surfaces defined by the side portions, wherein the side cushions protrude to an extent greater than the central cushion to conform with a shape of a skull of a subject.

16. The head support assembly of claim 15, wherein the central cushion comprises a first portion that protrudes to a first extent from said central surface and a second portion that protrudes to a second extent from said central surface, said second extent is greater than the first extent, the central portion comprises a pair of supporting cushions, each member of the pair is located at a different side of the central cushion and spaced apart therefrom.

17. The head support assembly of claim 14, comprising a chin support unit detachably coupled to the headrest member.

18. A head support unit for a head support assembly having a right support post and a left support post attachable respectively to a right frame member and a left frame member of a seat, said support unit comprising:
a support body;
a right attachment element and a left attachment element configured for articulation with said right support post and said left support post, respectively, said right attachment element and said left attachment element being disposed at opposite sides of the support body and connected thereto via a right extending element and a left extending element, respectively;
an adjustment mechanism configured for selectively adjusting the position of the right attachment element and the left attachment element with respect to each other, by displacing said right extending element and said left extending element, respectively, between a retracted position and an extended position; and a neutralizing mechanism operative with said adjustment mechanism for selectively allowing free displacement of the support body with respect to at least one of said right extending element and said left extending element.

19. The head support unit of claim 18, wherein said neutralizing mechanism is switchable between an operative state at which said adjustment mechanism is operative for displacing both of said right extending element and said left extending element, and a fully inoperative state at which the support body is freely displaceable with respect both of said right extending element and said left extending element and irrespectively of said adjustment mechanism.

20. The head support unit of claim 19, wherein the adjustment mechanism comprises: right and left drive elements, oppositely disposed to one another along a length of the right extending element and the left side extending element, respectively; and a driving gear comprising a driving portion configured, at said operative state of the neutralizing mechanism, to be engaged with the right and left drive elements and configured, upon rotation of the driving gear, for displacing said right extending element and said left extending element, respectively;

wherein said neutralizing mechanism comprises a neutralizing member configured for axially displacing said driving portion along a rotation axis thereof between an engaged position corresponding to said operative state and at which said driving portion is engaged with the right and left drive elements, and a disengaged position corresponding to said inoperative state and at which said driving portion is disengaged from both of said right extending element and said left extending element.

* * * * *